(12) United States Patent
Portillo et al.

(10) Patent No.: US 7,949,600 B1
(45) Date of Patent: May 24, 2011

(54) METHOD FOR FACILITATING PAYMENT OF A COMPUTERIZED TRANSACTION

(75) Inventors: Humberto C. Portillo, Upper Saddle River, NJ (US); Stefan Ianta, Vienna (AT); Scott C Hansen, Woodcliff Lake, NJ (US); Marcus Nicholas Cudina, Upper Saddle River, NJ (US)

(73) Assignee: Western Union Financial Services, Inc., Englewood, CO (US)

( * ) Notice: Subject to any disclaimer, the term of this patent is extended or adjusted under 35 U.S.C. 154(b) by 1378 days.

(21) Appl. No.: 09/604,525

(22) Filed: Jun. 27, 2000

(51) Int. Cl.
*G06Q 40/00* (2006.01)
(52) U.S. Cl. .................................................. 705/39
(58) Field of Classification Search .............. 705/35–45, 705/26–27, 34
See application file for complete search history.

(56) References Cited

U.S. PATENT DOCUMENTS

| | | | |
|---|---|---|---|
| 5,220,501 A | | 6/1993 | Lawlor et al. |
| 5,497,418 A | * | 3/1996 | Kudelski ................. 380/242 |
| 5,555,496 A | | 9/1996 | Tackbary et al. |
| 5,629,982 A | | 5/1997 | Micali |
| 5,664,110 A | | 9/1997 | Green et al. |
| 5,699,528 A | | 12/1997 | Hogan |
| 5,732,400 A | | 3/1998 | Mandler et al. |
| 5,745,886 A | | 4/1998 | Rosen |
| 5,757,917 A | | 5/1998 | Rose et al. |
| 5,794,221 A | * | 8/1998 | Egendorf .................. 705/40 |
| 5,825,003 A | | 10/1998 | Jennings |
| 5,826,241 A | | 10/1998 | Stein et al. |
| 5,884,288 A | | 3/1999 | Chang et al. |
| 5,897,621 A | * | 4/1999 | Boesch et al. .............. 705/26 |
| 5,897,622 A | | 4/1999 | Blinn et al. |
| 5,899,980 A | | 5/1999 | Wilf et al. |
| 5,909,492 A | | 6/1999 | Payne |
| 5,915,023 A | | 6/1999 | Bernstein |
| 5,936,221 A | | 8/1999 | Corder et al. |
| 5,960,412 A | | 9/1999 | Tackbary et al. |
| 5,963,647 A | * | 10/1999 | Downing et al. .......... 705/39 |

(Continued)

FOREIGN PATENT DOCUMENTS

EP   0 745 961 A2   4/1996

(Continued)

OTHER PUBLICATIONS

Togurt, David, CVG, FDC & EDS Highlight Internet Strategies, Morgan Stanley Dean Witter, Mar. 21, 2000, pp. 1-4.*

(Continued)

*Primary Examiner* — James P Trammell
*Assistant Examiner* — Elda Milef
(74) *Attorney, Agent, or Firm* — Sutherland Asbill & Brennan LLP

(57) ABSTRACT

Systems and methods for facilitating payment of a computerized transaction. One method according to an embodiment of the invention includes providing a money transfer system; receiving at the money transfer system an electronic payment request; assigning, by the money transfer system, a unique transaction number to the payment request; determining by the money transfer system a preliminary total amount required from the buyer; determining by the money transfer system a grand total amount; communicating information from the money transfer system to the seller computer system; receiving at the money transfer system a payment notification; communicating a message to the seller computer system that payment associated with the unique transaction number has been received at a payment location; and effecting completion of the electronic payment request by making payment via the money transfer system to the seller.

138 Claims, 19 Drawing Sheets

U.S. PATENT DOCUMENTS

| | | | |
|---|---|---|---|
| 5,966,698 A | 10/1999 | Pollin | |
| 5,974,146 A | 10/1999 | Randle et al. | |
| 6,007,426 A * | 12/1999 | Kelly et al. | 463/16 |
| 6,029,150 A | 2/2000 | Kravitz | |
| 6,032,133 A | 2/2000 | Hilt et al. | |
| 6,044,362 A | 3/2000 | Neely | |
| 6,058,417 A * | 5/2000 | Hess et al. | 709/219 |
| 6,061,665 A | 5/2000 | Bahreman | |
| 6,064,990 A | 5/2000 | Goldsmith | |
| 6,070,150 A | 5/2000 | Remington et al. | |
| 6,070,798 A | 6/2000 | Nethery | |
| 6,078,907 A | 6/2000 | Lamm | |
| 6,081,790 A | 6/2000 | Rosen | |
| 6,088,683 A | 7/2000 | Jalili | |
| 6,098,053 A | 8/2000 | Slater | |
| 6,119,106 A | 9/2000 | Mersky et al. | |
| 6,122,625 A | 9/2000 | Rosen | |
| 6,128,603 A | 10/2000 | Dent et al. | |
| 6,141,653 A * | 10/2000 | Conklin et al. | 705/80 |
| 6,167,386 A | 12/2000 | Brown | |
| 6,173,272 B1 | 1/2001 | Thomas et al. | |
| 6,175,823 B1 | 1/2001 | Van Dusen | |
| 6,189,787 B1 | 2/2001 | Dorf | |
| 6,202,054 B1 | 3/2001 | Lawlor et al. | |
| 6,246,996 B1 | 6/2001 | Stein et al. | |
| 6,247,047 B1 | 6/2001 | Wolff | |
| 6,263,446 B1 | 7/2001 | Kausik et al. | |
| 6,269,369 B1 | 7/2001 | Robertson | |
| 6,289,322 B1 | 9/2001 | Kitchen et al. | |
| 6,292,389 B1 | 9/2001 | Chen et al. | |
| 6,317,745 B1 | 11/2001 | Thomas et al. | |
| 6,324,525 B1 * | 11/2001 | Kramer et al. | 705/40 |
| 6,339,766 B1 | 1/2002 | Gephart | |
| 6,356,878 B1 * | 3/2002 | Walker et al. | 705/26 |
| 6,411,942 B1 | 6/2002 | Fujimoto | |
| 6,449,599 B1 | 9/2002 | Payne et al. | |
| 6,484,260 B1 | 11/2002 | Scott et al. | |
| 6,488,203 B1 * | 12/2002 | Stoutenburg et al. | 235/379 |
| 6,609,113 B1 * | 8/2003 | O'Leary et al. | 705/39 |
| 6,938,013 B1 * | 8/2005 | Gutierrez-Sheris | 705/39 |
| 7,082,412 B1 | 7/2006 | Treider et al. | |
| 7,177,836 B1 | 2/2007 | German et al. | |
| 2001/0025271 A1 * | 9/2001 | Allen | 705/65 |
| 2001/0032183 A1 | 10/2001 | Landry | |
| 2002/0007341 A1 | 1/2002 | Lent et al. | |
| 2002/0023055 A1 | 2/2002 | Antognini et al. | |
| 2007/0136189 A1 * | 6/2007 | German et al. | 705/39 |

FOREIGN PATENT DOCUMENTS

| | | |
|---|---|---|
| EP | 0 745 961 A3 | 7/1998 |
| EP | 0949 596 A2 | 10/1999 |
| EP | 1 077 436 A2 | 2/2001 |
| WO | WO 98/49644 | 11/1998 |
| WO | WO 99/22291 | 5/1999 |
| WO | WO 00/22559 A1 | 4/2000 |
| WO | WO 00/46725 | 8/2000 |
| WO | WO 00/54122 A2 | 9/2000 |
| WO | WO 00/67177 A2 | 11/2000 |
| WO | WO 00/79452 A2 | 12/2000 |
| WO | WO 01/04816 | 1/2001 |
| WO | 2002001469 A2 | 1/2002 |

OTHER PUBLICATIONS

Ebay Teams with Parcel Plus, Tradesafe, and i-Escrow to Provide Seamless Shopping and Shipping for the Holidays; Shipping and escrow services now just a mouse click away on ebay, Nov. 24, 1997; Business Wire, p. 11240269.*

Godwin, Nadine; The changeover to computers puts shiplines in new waters.; Dec. 23, 1985; Travel Weekly, v44, p. 19.*

Prince, Dennis L. "Auction This! Your Complete Guide to the World of Online Auctions", (Prima Publishing, 1999), 6 pages.*

Kraus, James R. "Regulators Target Illegal Money-Transfer Firms States Fear companies Abuse Immigrant clients, Laundering of Drug Funds" American Banker. New York, NY: Aug. 24, 1998. vol. 153, Iss. 165; p. 3 (3 pages).*

Ina Steiner, "PayPal Online Payment Service—Another Way to Pay for Auction Items," AuctionBytes.com, Feb. 20, 2000, 4 pages, No. 8, ISSN-1528-6703, found on www.auctionbytes.com Internet Web site and printed on Sep. 23, 2003.

Ina Steiner, "BidPay.com Offers Click and Pay Service for Buyers," Jan. 23, 2000, 4 pages, No. 6, ISSN-1528-6703, found on www.auctionbytes.com Internet Web site and printed on Sep. 23, 2003.

Ina Steiner, "Follow-up to BidPay Article," Feb. 7, 2000, 4 pages, No. 7, ISSN-1528-6703, found on www.auctionbytes.com Internet Web site and printed on Sep. 23, 2003.

Steven Baras, Staff Letters and Memoranda, State of New York Banking Department, Jul. 18, 2000, 2 pages, found on www.banking.state.ny.us Internet Web site and printed on Sep. 23, 2003.

Almar Latour, "PayPal Electronic Plan May Be on the Money in Years to Come," The Wall Street Journal Interactive Edition, Nov. 15, 1999, 2 pages, found on www.paypal.com Internet Web site and printed on Sep. 23, 2003.

Hal Plotkin, "Beam Me up Some Cash," Silicon Valley Insider, Sep. 8, 1999, 3 pages, found on www.halplotkin.com Internet Web site and printed on Sep. 23, 2003.

Karen Epper Hoffman, "PayPal Still Running Free But the e-payments company's carefree days may be numbered if regulators decide it's essentially a bank," Bank Technology News, found on www.banktechnews.com Internet Web site and printed on Sep. 23, 2003, date of publication unknown but believed to be after the filind date of the present application.

Author Unknown, "PayPal.com Case Study," 7 pages, found on fox.rollins.edu Internet Web site and printed on Sep. 23, 2003, date of publication unknown but believed to be after the filing date of the present application.

Author Unknown (indicated as Confinity, Inc.), "PayPal for the Palm," 2 pages, found on www.handheldnews.com Internet Web site and printed on Sep. 23, 2003, date of publication unknown but believed to be after the filing date of the present application.

Author Unknown, "PayPal—News," 3 pages, found on www.andrys.com Internet Web site and printed on Sep. 23, 2003, date of publication unknown but believed to be after the filing date of the present application.

Author Unknown, "Online Payment Services," compiled Nov. 2002, date of publication believed to be in Nov. 2002 or after, 3 pages, found on www.auctionbytes.com Internet Web site and printed on Sep. 30, 2003.

Ina Steiner, "Accepting Credit Cards When You Sell Items: ProPay and Billpoint Payment Services," Jun. 18, 2000, 4 pages, Auctionbytes-Update No. 16, ISSN-1528-6703, found on www.auctionbytes.com Internet Web site and printed on Sep. 30, 2003.

Author Unknown, "Sell Now. Buy Smart. That's the Point. About Billpoint," 24 pages, found on www.billpoint.com Internet Web Site and printed on Jul. 23, 2000, date of publication unknown but believed to be after the filing date of the present application.

Author Unknown, "i-Escrow Online Escrow Service—Secure Online Payments," 12 pages, found on www.iescrow.com and printed on Jul. 23, 2000, date of publication unknown but believed to be after the filing date of the present application.

Author Unknown, "paymybills.com—How the Service Works," 18 pages, found on www.paymybills.com and printed on Jul. 23, 2000, date of publication unknown but believed to be after the filing date of the present application.

Author Unknown, "Send and request money online for FREE!," 19 pages, found on www.paypal.x.com and printed on Jul. 23, 2000, date of publication unknown but believed to be after the filing date of the present application.

Author Unknown, "PayMe.com is the easiest way to securely transfer money for FREE!," 14 pages, found on www.payme.com and printed on Jul. 23, 2000, date of publication unknown but believed to be after the filing date of the present application.

Author Unknown, "Welcome to eMoneyMail! You can now send money over the Internet easily and safely to anyone in the United States who has an e-mail address," 16 pages, found on www.emoneymail.com and printed on Jul. 23, 2000, date of publication unknown but believed to be after the filing date of the present application.

Author Unknown, "Welcome to ecount.com—Ecount is the first personal payment account for secure shopping anywhere, personal email payments and more," 15 pages, found on www.ecount.com and printed on Jul. 23, 2000, date of publication unknown but believed to be after the filing date of the present application.

Author Unknown, "Tradesafe.com is the online payment service enabling consumer and business e-commerce," 18 pages, found on www.tradesafe.com and printed on Jul. 23, 2000, date of publication unknown but believed to be after the filing date of the present application.

Author Unknown, "About Western Union," 9 pages, located on www.westernunion.com and printed on Jun. 10, 2003, date of publication unknown but believed to be after the filing date of the present application.

Author Unknown, "WHOIS Search Results—WHOIS Record for bidpay.com," 2 pages, located on www.networksolutions.com and printed Oct. 14, 2003, date of publication unknown but believed to be after the filing date of the present application.

Author Unknown, "First Data Acquires PaySys International," 2 pages, located on http://www.paysys.com/news/press2001/paysys043001.pdf and printed Oct. 14, 2003, date of publication unknown but believed to be after the filing date of the present application.

Author Unknown, "PaySys sign up four Asian distributors," 2 pages, located on www.bizjournals.com and printed Oct. 14, 2003, date of publication unknown but believed to be after the filing date of the present application.

Author Unknown, "VisionPLUS Consumer Payment Solution Overview," 2 pages, located on www.paysys.com and printed Oct. 14, 2003, date of publication unknown but believed to be after the filing date of the present application.

Author Unknown, "Payment and Services from PaySys," 2 pages, located on www.paysys.com and printed Oct. 14, 2003, date of publication unknown but believed to be after the filing date of the present application.

Author Unknown, "PaySys—company overview," 2 pages, located on www.paysys.com and printed Oct. 14, 2003, date of publication unknown but believed to be after the filing date of the present application.

Author Unknown, "BidPay: Buyer FAQs—Sending Payment and Using the Money Order Service," 7 pages, located on www.bidpay.com and printed Oct. 14, 2003, date of publication unknown but believed to be after the filing date of the present application.

Author Unknown, "BidPay: Seller FAQs—Receiving Payments and Using the Money Order Service," 7 pages, located on www.bidpay.com and printed Oct. 14, 2003, date of publication unknown but believed to be after the filing date of the present application.

Author Unknown, "A million credit card transactions in five hours," 2 pages, located on www.hoise.com and printed Oct. 14, 2003, date of publication unknown but believed to be after the filing date of the present application.

dotBANK; "The Way to Send and Receive Money on the Internet;" retrieved from the Internet on Feb. 7, 2000 at http://www.dotbank.com/; pp. 1-7.

AmeriNet, Inc.; "The Best Idea in Payment Systems Since the Credit Card;" retrieved from the Internet on Feb. 7, 2000 at http://www.devit-it.com/; pp. 1-8.

TransPoint; "The Way to Pay Online the Service;" retrieved from the Internet on Feb. 10, 2000 at http://www.transpoint.com/service_questions.asp; pp. 1-12.

Intell-A-Check! "The Way to Get Paid;" retrieved from the Internet on Feb. 7, 2000 at http://www.icheck.conil; pp. 1-7.

TeleCheck: "Making Checks Our Responsibility;" retrieved from the Internet on Feb. 7, 2000 at http://www.telecheck.com/home/home.html; pp. 1-8.

International Preliminary Examination Report for PCT/US01/20482 dated Oct. 26, 2007.

Disclosure Under 37 C.F.R. § 1.56 for U.S. Appl. No. 09/604,525.

Author Unknown, "AmeriNet, Inx.—Making electronic debit simple/The Best idea in Payment Systems since the Credit Card," 6 pages, located on the www.debit-it.com and printed Feb. 7, 2000, date of publication unknown.

Author Unknown, "Making Checks Our Responsibility," 8 pages, located on www.telecheck.com and printed Feb. 7, 2000, date of publication unknown.

* cited by examiner

FIG. 6A order confirmation

Figure 6C:
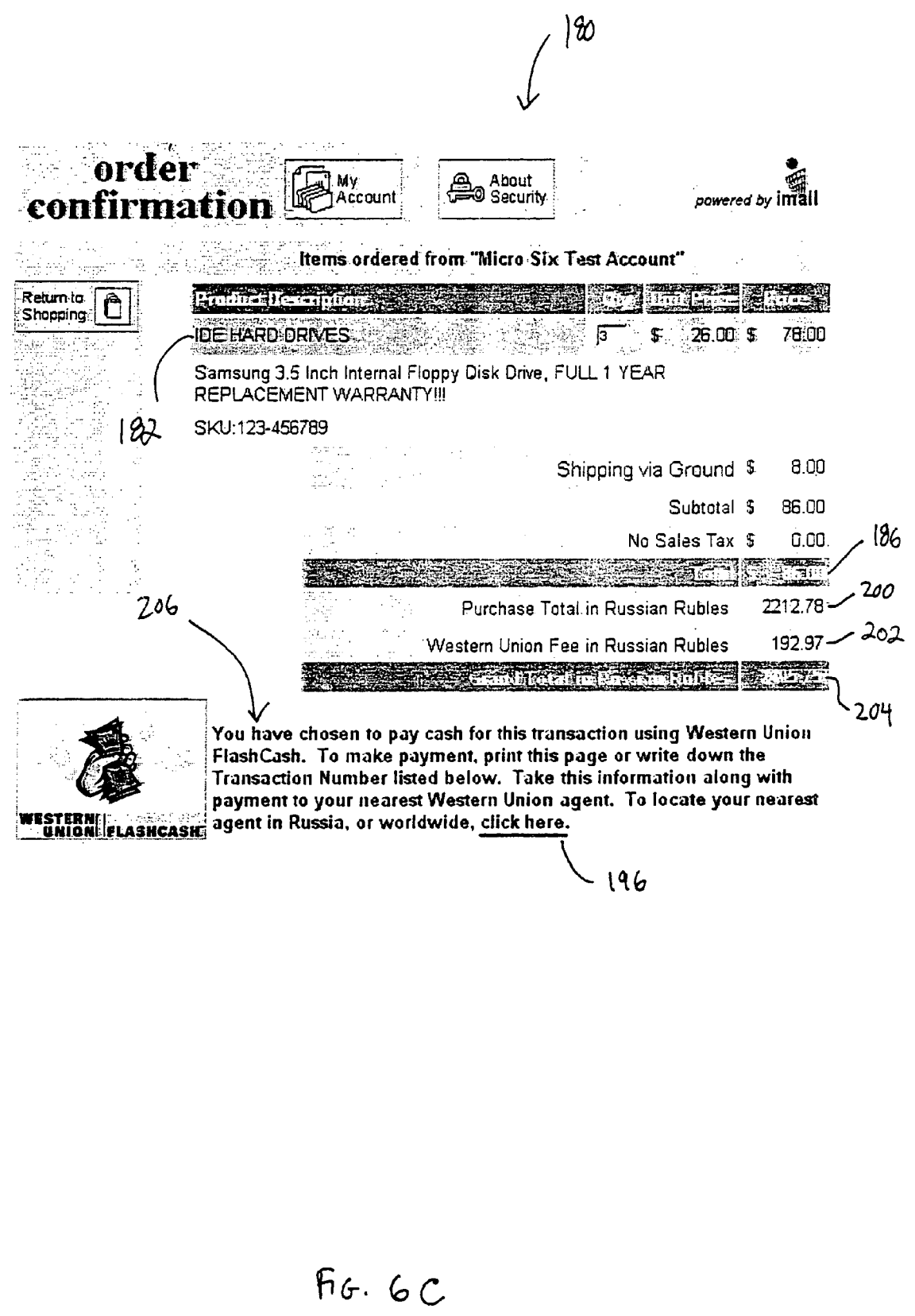

*powered by imall*

Items ordered from "Micro Six Test Account"

| Product Description | Qty | Unit Price | Total |
|---|---|---|---|
| IDE HARD DRIVES | 3 | $ 26.00 | $ 78.00 |
| Samsung 3.5 Inch Internal Floppy Disk Drive, FULL 1 YEAR REPLACEMENT WARRANTY!!! SKU:123-456789 | | | |

Shipping via Ground $ 8.00
Subtotal $ 86.00
No Sales Tax $ 0.00

Purchase Total in Russian Rubles 2212.78
Western Union Fee in Russian Rubles 192.97

You have chosen to pay cash for this transaction using Western Union FlashCash. To make payment, print this page or write down the Transaction Number listed below. Take this information along with payment to your nearest Western Union agent. To locate your nearest agent in Russia, or worldwide, click here.

Transaction Number: 1234567890 /— 208

Products selected for purchase will not be shipped until payment is received by Western Union. If not paid within 72 hours, this order will be cancelled.

194 — Tell Me More About WesternUnion FlashCash

The current exchange rate is: ——— 198
$1.00 USD = 25.73 Russian Rubles

Thank you for ordering from "XYZ" Merchant. Your order #xxxxx-xxxxxxxxxx was received mm/dd/yyyy a.m..p.m. You will receive an e-mail confirmation at your selected e-mail address.

| Ship to Name/Address/Phone: | Bill to Name/Address/Phone: |
|---|---|
| Robert L. Martin | Robert L. Martin |
| 5314 North | 5314 North |
| 250 West | 250 West |
| Rostov-on-Don | Rostov-on-Don |
| abc123 Russia | abc123 Russia |
| 15.888.426.7306 | 15.888.426.7306 |
| 15.888.426.7306 | 15.888.426.7306 |

194 A        194 B

For followup order questions, please contact "XYZ" Merchant via phone, FAX, or e-mail:

| E-Mail: | orders@"XYZ"Merchant.com |
| Toll-Free Phone #: | 1-800-xxx-call |
| Phone #: | 1-xxx-555-1212 |
| FAX: | 1-800-fax-xxxx |
| Website: | "XYZ"Merchant.com |
| Mailing Address: | "XYZ" Merchant |
| | 123 Address Way |
| | Suite xxx |
| | Anytown, USA 12345 |

FIG. 6D

| | | | | |
|---|---|---|---|---|
| Uneeda Check Cashing #28 | New York | NY 862 Lexington Ave | 10021 | |
| Food Emporium #742 | New York | NY 1066 Third Avenue | 10021 | |
| Esther Check Cashing | New York | NY 91-A Pinehurst Ave | 10033 | |
| A&P #712 | New York | NY 223 West End Ave | 10023 | |
| Food Emporium #727 | New York | NY 452 West 43Rd St | 10036 | |
| Banco Popular Fsb | West New York | NJ 5310 Bergenline Ave | 07093 | |
| Kara Travel & Tours | New York | NY 1225 Broadway Suite #815 | 10001 | |
| Uneeda Check Cashing #24 | New York | NY 250 East Houston St | 10002 | |
| Empire Travel | New York | NY 103 Clinton St | 10002 | |
| Chambers St Check Cash | New York | NY 79 Chambers St | 10007 | |
| Western Union | New York | NY 1440 Broadway | 10013 | |
| Esco Drug Co Inc | New York | NY 687 9Th Ave | 10036 | |
| Harold Lee & Sons Inc | New York | NY 32 Pell St | 10013 | |
| Pay-O-Matic #301 | New York | NY 200 West 14Th St | 10011 | |
| 79 Avenue D Check Cashing Corp | New York | NY 89-97 Ave C | 10009 | |
| Pay-O-Matic #315 | New York | NY 2351 Second Ave | 10035 | |
| Columbus Circle Ck Cashng | New York | NY 867 9Th Ave | 10019 | |
| G & R Check Cash #19 | New York | NY 73 4Th Ave | 10003 | |
| Pay-O-Matic #317 | New York | NY 3426 Broadway | 10031 | |
| Pay-O-Matic #318 | New York | NY 3651 Broadway | 10031 | |
| Pay-O-Matic #320 | New York | NY 4984 Broadway | 10034 | |
| Gamma Check Cashing | New York | NY 158 E 45 St | 10017 | |
| Ukrainian Orthodox Fcu | New York | NY 215 Second Ave | 10003 | |
| Popular Cash Express | New York | NY 175 Dyckman St | 10040 | |
| Franklin Check Cashing #1 | New York | NY 229 Avenue B | 10009 | |
| Yomar Travel Corp | New York | NY 96 Nagle Ave | 10040 | |
| Natalie's Travel | New York | NY 319 Audubon | 10033 | |

METHOD FOR FACILITATING PAYMENT OF A COMPUTERIZED TRANSACTION

CROSS REFERENCE TO RELATED APPLICATIONS

This application discloses similar subject matter as disclosed in U.S. patent application Ser. No. 09/476,384 titled "A Computer-Implementable Method for Using an On-Line Cash Register" filed on Dec. 30, 1999, U.S. patent application Ser. No. 09/476,385 titled "Method and System for Payment Transactions and Shipment Tracking Over the Internet" filed on Dec. 30, 1999, U.S. patent application Ser. No. 09/476,386 titled "A Computer-Implemented Method for Providing a Consumer-to-Consumer Payment Service" filed on Dec. 30, 1999, and U.S. patent application Ser. No. 09/552,073 titled "Cash Card" filed Apr. 19, 2000.

FIELD OF THE INVENTION

This invention relates in general to a method for facilitating a payment for a computerized transaction between a buyer and a seller using a computer network, such as the Internet.

BACKGROUND OF THE INVENTION

With the increased worldwide use of the Internet, a greater number of businesses and merchants are creating "virtual" storefronts accessible to users on the Internet. These merchants offer, for example, retail products ranging from books, compact discs, and clothing to furniture, airline tickets, and antiques, just to name a few. In fact, the Internet has become such a major vehicle for electronic commerce that many Internet businesses display their products and take orders from customers exclusively over the Internet. While the Internet provides an effective means for merchants to promote, display, or list their various products to an enormous market of potential customers, there are only a few conventional methods by which a customer or buyer can pay the merchant for any goods or services purchased electronically over the Internet.

Conventionally, an Internet user can purchase an item from a merchant over the Internet using a credit card, or by a COD (cash on delivery) service, or by check or money order, or the like. In the credit card payment method, buyers provide their confidential credit card information to the merchant over the Internet, and the merchant processes the transaction by charging the buyers' credit card. The credit card payment method has the disadvantage of inaccessibility to all potential Internet purchasers, as every Internet user may not have a credit card account with a sufficient credit limit to complete a desired transaction. Further, many Internet users are reluctant to use the credit card payment method due to the perception that confidential credit card information may be intercepted, stolen, or otherwise misused when communicated over the Internet. The conventional credit card payment method may be problematic for international customers for the same reasons.

An "electronic wallet/purse" payment method also exists, wherein for on-line purchases the consumer uses an Internet "wallet/purse" account which draws against an actual checking account, credit card, or debit card. This approach also has limited usefulness for consumers who do not have checking accounts or credit cards, or for consumers who choose not wish to provide the checking account or credit card account information over the Internet to establish the virtual wallet/purse.

Further, merchants are often reluctant to accept credit card orders from some foreign countries due to the possibility of fraud. Also, merchants wishing to sell products to U.S. and international consumers may be hampered by the merchant's inability to obtain and establish merchant credit card processing accounts, particularly where the merchants are international merchants without an appropriate U.S. domicile.

Accordingly, what is needed is a method for facilitating the purchase of goods and services over the Internet by consumers who either do not have credit card accounts, or choose not to provide confidential credit card account information or checking account information over the Internet. It with this background in mind that the present invention was developed.

SUMMARY OF THE INVENTION

In light of the above, and according to a broad aspect of the invention, disclosed herein is a method for facilitating a payment for a computerized transaction between a buyer and a seller using a computer network, such as the Internet. The method includes the steps of communicating, from a seller's computing station to an agent computing system, data regarding the transaction between the buyer and the seller, wherein the data identifies the buyer, the seller, and the amount of the transaction. In one example, the agent computing system is a money transfer system having a computer and a database. The agent computing system communicates transaction information displayable to the buyer. In one example, the transaction information is sent to the seller's computing station, and the seller displays the transaction information to the buyer on one or more pages of the seller's web site when accessed by the buyer. Receiving an actual payment from the buyer at a plurality of agent locations is provided for, the agent locations being in communication with the agent computing system. Upon receiving the actual payment from the buyer at one of the agent locations, a message is communicated to the seller that the actual payment for the transaction was received at the agent location, thereby permitting the seller to begin shipment of the item to the buyer. Funds are transferred to the seller, and in one example, the agent computing system transfers funds into an account established with the seller.

In one embodiment, the transaction information includes a confirmation number created by the agent computing system for identifying the transaction. The transaction information can also include an order number corresponding to a merchant order number provided by the merchant for identifying the transaction; a new total price which is the amount of the transaction plus a processing fee due from the buyer payable at the agent location; and an exchange rate between a first local currency usable to the buyer and a second currency usable by the seller. The total price of the transaction can be expressed in the first local currency usable by the buyer, so that the buyer can pay at the agent location in the buyer's local currency. Preferably the funds transferred to the seller from the agent computing system are paid in the second currency usable by the seller.

According to another broad aspect of the invention, disclosed herein is a method for processing a payment for a computerized transaction between a buyer and a seller for the purchase of an item, wherein the transaction being initiated over a computer network such as the Internet. The method includes providing an agent computing system coupled to the computer network, the agent computing system adapted to communicate with a seller's computing station over the computer network; providing a plurality of agent payment locations accessible to the buyer, the agent payment locations communicating with the agent computing system over the computer network; communicating, from the seller's computing station to the agent computing system, data regarding the transaction between the buyer and the seller, wherein the data identifies the buyer, the seller, and the amount of the transaction; communicating transaction information to the buyer from the agent computing system; providing for receiving an actual payment from the buyer at one of the agent payment locations; and upon receiving the actual payment from the buyer at one of the plurality of the agent payment locations, communicating to the seller that the actual payment for the transaction was received at the agent payment location, thereby permitting the seller to begin shipment of the item to the buyer. Preferably, the agent computing system transfers funds to the seller in a currency usable by the seller.

The foregoing and other features, utilities and advantages of the invention will be apparent from the following more particular description of a preferred embodiment of the invention as illustrated in the accompanying drawings.

BRIEF DESCRIPTION OF THE DRAWINGS

FIGS. 6A-D illustrate a series of exemplary computer screens wherein an example of a merchant's web site is shown and the buyer/consumer has selected the payment method in accordance with one embodiment of the present invention, and the confirmation information and transaction number are displayed to the buyer/consumer in accordance with one embodiment of the present invention.

FIGS. 7A-B illustrate an example computer screen wherein information relating to agent locations is shown.

FIG. 8 illustrates an example of a form generated containing the electronic transaction information, the form being suitable for use by the agent at the agent station, in accordance with one embodiment of the present invention.

DETAILED DESCRIPTION OF THE PREFERRED EMBODIMENT

In accordance with the embodiments of the present invention, a method for facilitating payment of a computerized transaction is disclosed herein. The method can be implemented using a computing system coupled to a network, such as the Internet. The method generally permits a customer/buyer to select an electronic payment method for a purchase, obtain confirmation information regarding the transaction, and provides for the customer/user to make an actual payment for the transaction at one of a plurality of payment locations accessible to the buyer. The actual payment is preferably a cash payment, although the payment could also be in the form of a check, money order, credit card, or the like.

Upon receiving the payment from the buyer at one of the payment locations, the seller is notified over the Internet that the actual payment for the transaction was received at a payment location, and the seller can then ship the purchased items to the buyer. In this manner, a buyer can use the payment method of the present invention to pay for an item purchased over a computer network without the need for having to use a credit card, and without having to provide confidential information, such as a credit card account number or a bank account number, over the Internet.

Figure 1:
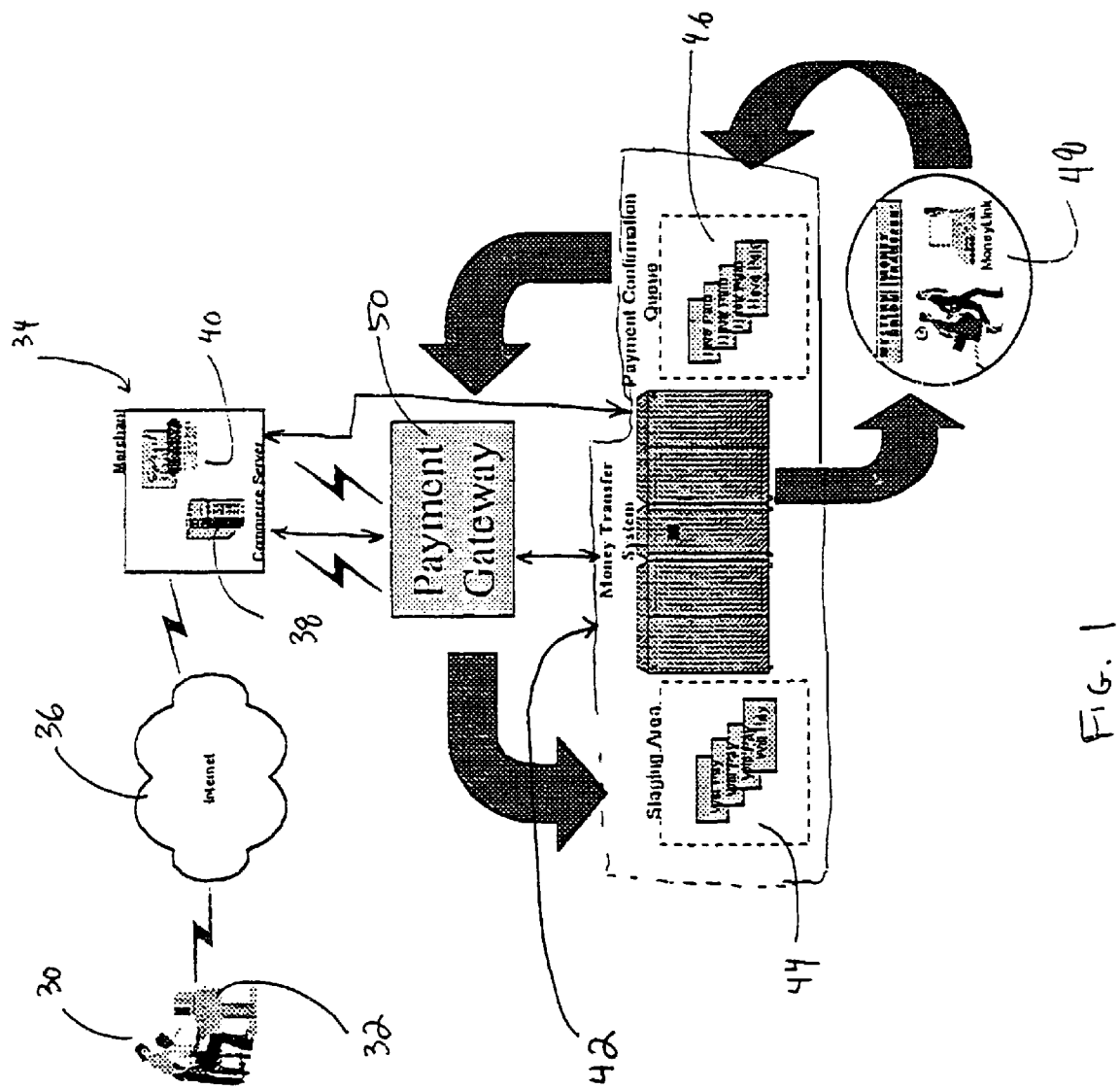
FIG. 1 illustrates a block diagram of a system for facilitating a transfer of a payment for a computerized transaction between a buyer and a seller using a computer network, such as the Internet, in accordance with one embodiment of the present invention.

Referring to FIG. 1, a block diagram of a system for facilitating a transfer of a payment for a computerized transaction is shown, in accordance with one embodiment of the present invention.

A buyer or customer 30, having a buyer's computing station 32, communicates with a merchant's or seller's computing system 34 over a computer network 36, such as the Internet. The merchant or seller's computing system 34 can include a server 38 which hosts the merchant's web site 40 for access by a plurality of potential buyers over the Internet. The merchant's web site 40 is, in accordance with the present invention, adapted to display an electronic payment method in accordance with the present invention, referred to herein as "FLASHCASH (SM)" or as the electronic payment method of the present invention. The merchant's web site 40 is adapted to display an icon, or other user-selectable indicia, to launch the electronic payment method described herein.

An agent computing system 42 (also referred to herein as a money transfer system) is also shown in FIG. 1, which is responsible for processing incoming requests from merchants or buyers regarding the electronic payment. In one example, the agent computing system 42 has a staging area 44 and a payment confirmation queue 46. The staging area 44 is used to queue and track incoming transaction requests. For instance, upon the buyer selecting an item for purchase and selecting the electronic payment method, the merchant's server 38 generates an electronic payment request which is transferred to the agent computing system 42. The agent computing system 42 receives the request, and creates a unique record of the request and stores the unique record in the staging area 44. Further operations performed by the agent computing system/money transfer system are described below.

The record includes data regarding the transaction, including, for example, the buyer's identification (such as a name, e-mail address, physical address, etc.), the seller's identification (the seller's name, physical address, phone number, e-mail address, etc.), the date of the transaction, a summary of the item or items being purchased, along with the purchase and shipping price for the items, and a total price for the transaction. Further, the agent computing system 42 assigns a unique transaction or confirmation number, to each incoming transaction request. This number is uniquely and permanently associated with the particular transaction during the life of the transaction. In one example, the transaction number is used as a reference number for the transaction until the transaction has been completed (i.e., the buyer has made the payment at the agent location). In one example, the uniqueness of the transaction number is limited from the time beginning when the transaction is initiated, to the time in which the buyer required to make the payment or once the payment has been made. After this time, the transaction number may be re-used by the agent computing system 42 to track another transaction. In one example, once the buyer makes the payment due, a money transfer control number, also being unique for each transaction, is provided as proof of payment or receipt.

Optionally, the agent computing system 42 can also associate an order number provided by the merchant for the merchant's tracking of the transaction. When the buyer has made an actual payment to one of the plurality of agent locations 48, the agent computing system 42 moves its record of the transaction from the staging area 44 to the payment confirmation queue 46, so that the seller can be notified of the buyer's payment, and the funds can be transferred to the seller.

As will be described below, the agent computing system 42 can also associate various exchange rates with the transaction based on the geographic location of either the buyer or the seller, and provide a calculated total price due by the buyer in a local currency usable by the buyer. In this manner, a buyer in a foreign country can purchase and employ the electronic payment method of the present invention to purchase an item using foreign currency, while the seller is paid for the transaction using its own local currency. In one example, the currency information associated with the transaction by the agent computing system is derived from the shipping information (i.e., buyer's and seller's addresses) shown in FIG. 5.

FIG. 1 also illustrates a plurality of agent locations 48 accessible to the buyer. Agent locations 48 may include any device capable of communicating with the agent computing system 42 and transferring value to the agent computing system 42 to complete payment of the transaction. The agent locations 48 are, in one example, physical business locations wherein the buyer can walk into one of the agent locations in order to physically make an actual payment in accordance with the present invention. In another example, agent locations 48 include stand-alone computing systems with money-transfer capabilities, such as an automatic teller machine (ATM) adapted to communicate with and transfer funds to the agent computing system 42.

Preferably, the agent locations 48 are located throughout cities and in various countries globally, so that a buyer can give an actual payment to one of the many agent locations 48 located throughout the world. Preferably, each agent location 48 is equipped with the capability to communicate, either by computer network or otherwise, with the agent computing system 42 to reference any of the transactions stored in the agent computing system 42. For instance, the plurality of agent locations 48 can be provided with computing systems which are coupled to and in communication with the agent computing system 42 over a computer network, such as the Internet or other computing network. Alternatively, other computing systems such as ATMs or the like can access the agent computing system 42.

A payment gateway 50 is also shown in FIG. 1. The payment gateway 50 is a means by which merchants optionally handle the processing of orders. Payment gateway 50 is generally provided to the merchant by a third-party service provider, to process payments. For instance, the payment gateway known as "CyberCash" provides payment software and services enabling conventional electronic commerce for merchants. The payment gateway 50 is a means by which the merchant offloads the transaction processing which would normally be handled at the merchant's server. However, not all Internet merchants use a third-party payment gateway. For example, at present, the amazon.com merchant web site has its own internal payment gateway for processing payments.

Hence, communications to and from the agent computing system 42 and the merchant's computing system 34 can be handled either by the payment gateway 50 or by the merchant's server 40 directly, depending upon the particular implementation chosen by the merchant. Accordingly, the functionality of the merchant's computing system 34 to communicate with the agent computing system 42 and the merchant's particular payment gateway could be included within the merchant's computing system 34.

In overall general operation, and referring to FIG. 1, the buyer 30 makes a purchase using the buyer's computing station 32 over the Internet 36 by accessing the merchant's web site 40, and the buyer selects the electronic payment method of the present invention as a way to pay for the purchase (instead of purchasing by using an credit card or other conventional means). The merchant's computing system 34 then communicates the transaction either to the payment gateway 50, or directly to the agent computing system 42, depending upon the particular implementation, for processing by the agent computing system 42 in accordance with the present invention. The operations shown in FIGS. 2-3 and the information shown in FIGS. 4-9 further illustrate various aspects of the invention.

Figure 2:
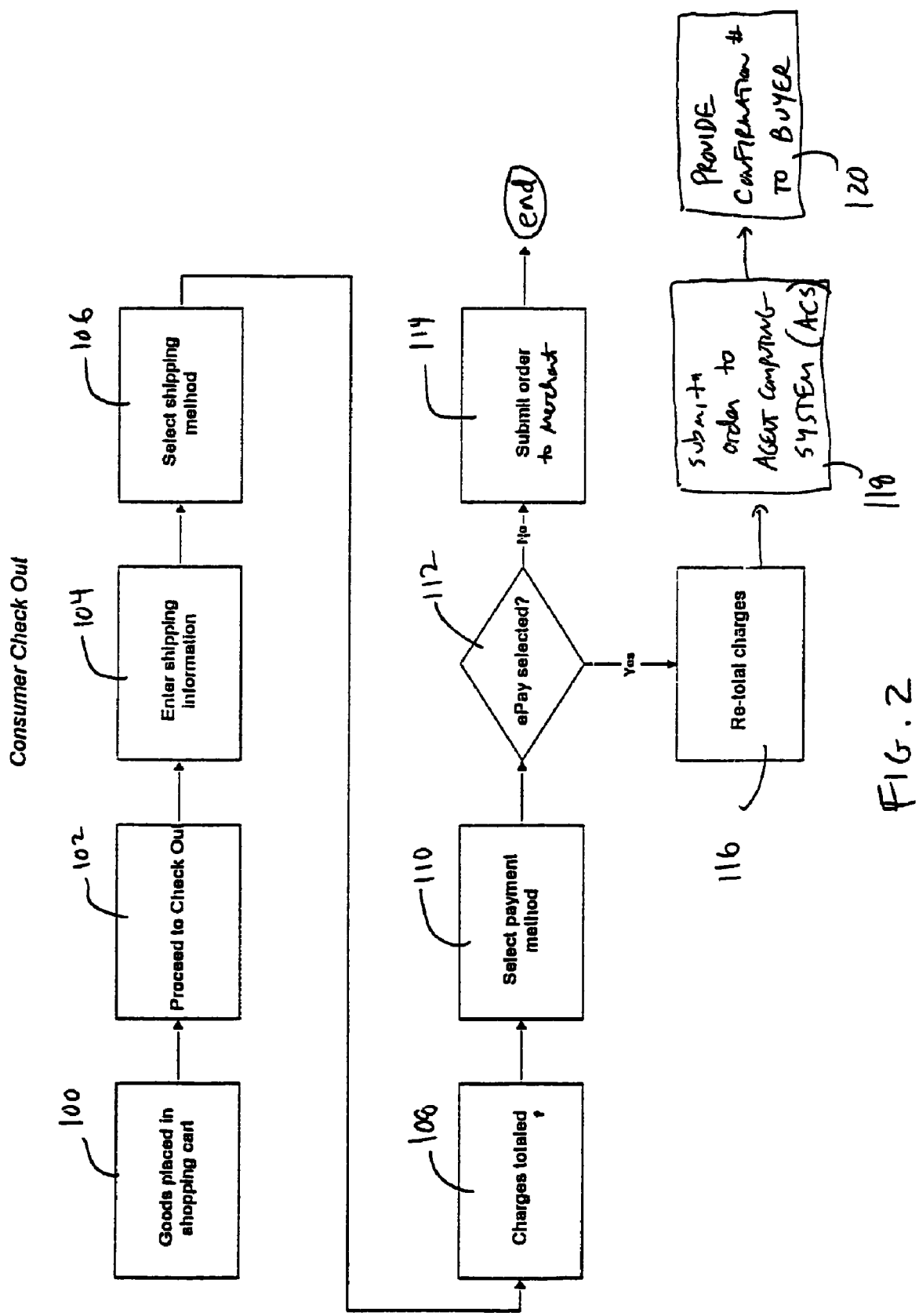
FIG. 2 illustrates the logical operations for a buyer/consumer to select the payment method for a computerized transaction in accordance with one embodiment of the present invention.

Referring now to FIG. 2, the logical operations for a buyer to select the payment method under the present invention are shown. At operation 100, the buyer selects goods to be purchased and places the goods in a virtual shopping cart. At operation 102, the buyer proceeds to the checkout section of the merchant's web site. At operation 104, the buyer enters the appropriate shipping information to have the goods delivered as the buyer desires, and at operation 106, the buyer selects the desired shipping method. At operation 108, the charges relating to the transaction (including the cost of the goods and the shipping charges) are totaled.

At operation 110, the buyer selects the desired method of payment for the transaction. Decision operation 112 determines if the electronic payment method of the present invention has been selected. If no, then operation 114 submits the order to the merchant for processing as is conventionally performed. However, if decision operation 112 determines that the electronic payment method of the present invention has been selected by the buyer, then operation 116 re-totals the charges to include a processing fee associated with the present invention. Operation 118 then submits the order to the merchant, and submits the order to the agent computing system in accordance with the present invention. At operation 120, the agent computing system logs the transaction and generates a confirmation number, which is preferably communicated to the merchant and to the consumer preferably through the merchant. The agent computing system 42 may communicate confirmation information using a variety of communications methods, such as, for example, facsimile transmission, automated telephonic response units, E-mail, personal digital assistants (PDAs), or the like.

Figure 3:
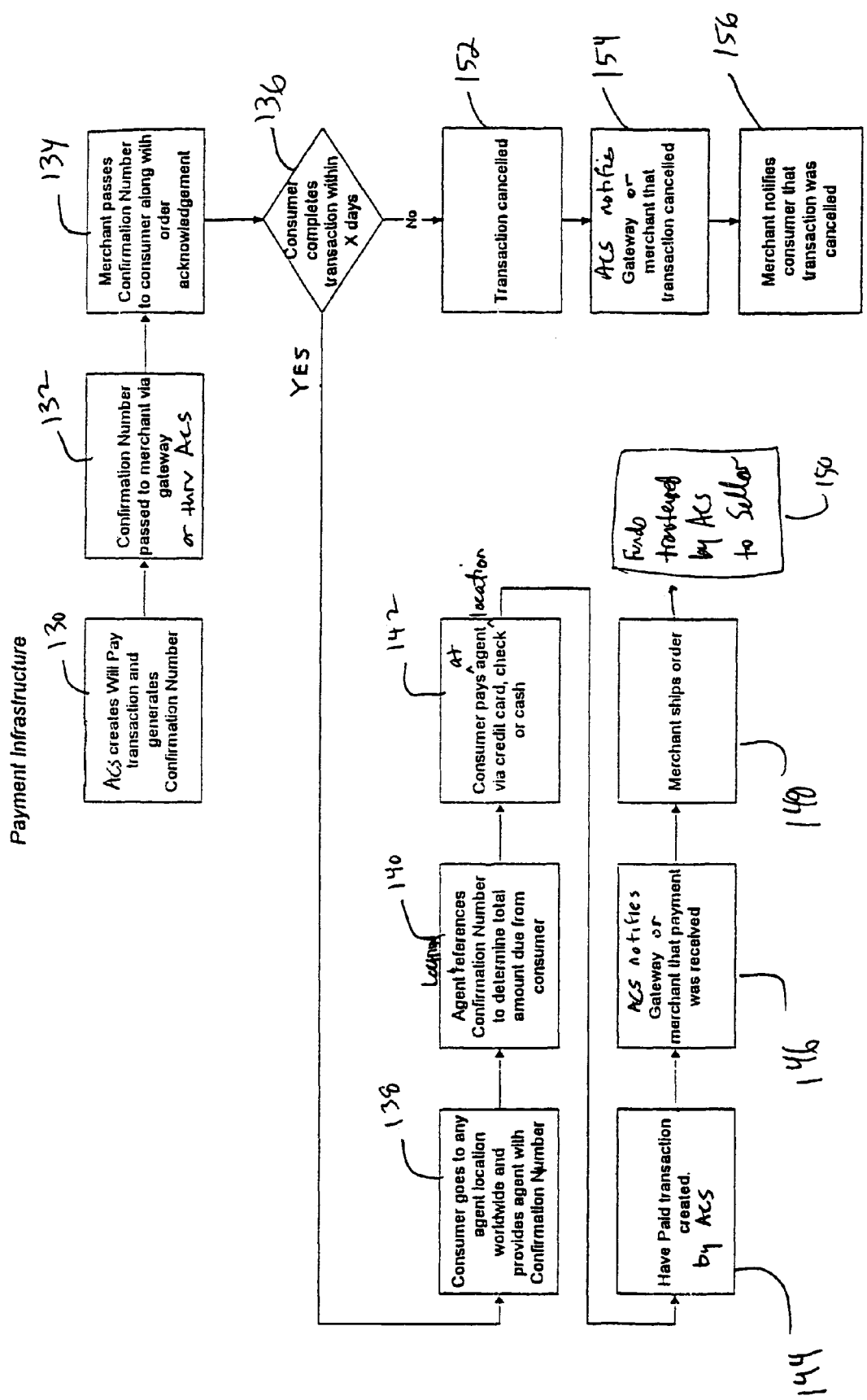
FIG. 3 illustrates the logical operations for an electronic transaction to be completed according to one embodiment of the present invention.

Referring to FIG. 3, the logical operations for the completion of an electronic transaction are illustrated according to one embodiment of the present invention. In response to a request to initiate a transaction, the agent computing system creates a "will pay" transaction and generates a confirmation number at operation 130. The "will pay" transaction is the internal record to the agent computing system which contains the information regarding the particular transaction, including the buyer's information, the seller's information, and a unique confirmation number associated with the transaction. At operation 132, the agent computing system passes the confirmation number to the merchant via the payment gateway, or directly to the merchant's server. At operation 134, the merchant passes the confirmation number to the consumer along with an order acknowledgment.

One feature of the present invention is that the agent computing system can optionally track the timeliness of the payment by the consumer. Decision operation 136 determines whether the consumer completes the transaction within an allotted number of days, as governed by an agreement between the merchant and the consumer. Operation 136 can be easily performed by the agent computing system through the use of a timer or date stamps associated with the transaction. In this manner, the agent computing system can track whether a particular transaction has become "stale" or whether the transaction can still be completed by timely payment of the consumer. It is understood, however, that operation 136 is optional.

At operation 138, the consumer visits any agent location worldwide, and provides the agent location with the confirmation number associated with the particular transaction. At operation 140, the agent location references the confirmation number to determine the total amount due from the consumer. This amount due can be expressed either in the same currency as used by the seller, or in a local currency usable by the buyer.

At operation 142, the consumer pays at the agent location, preferably using cash. However, the agent location could also be equipped to securely accept credit cards, checks, or other forms of payment. In this manner, the consumer has made a payment at a physical location, as opposed to having to communicate confidential credit card account information or checking account information over the Internet.

At operation 144, the agent computing system creates a "have paid" transaction, indicating that the consumer has paid the amount due for a particular transaction. At operation 146, the agent computing system notifies the payment gateway or the merchant directly to indicate to the merchant that the payment has been received. Preferably, the notification operation 146 is performed as quickly as possible, and preferably over a high-speed computer link, so that the merchant is promptly informed of the payment by the buyer. At operation 148, in response to receipt of the notification of the buyer's payment, the seller initiates the shipment of the order of the item to the buyer. At operation 150, the funds for the transaction are transferred to the seller to complete the transaction, under the direction of the agent computing system. The amount of the funds transferred to the seller are, in one example, the purchase price plus the shipping costs, and in another example, discounted by a transaction fee and/or a percentage fee of the transaction. It is understood that operation 150 could occur in parallel with operations 144 and 146. The funds transferred by operation 150 can be in a currency usable by the seller, such currency being the same or different currency as provided by the buyer at operation 142. In this way, purchasers in a foreign country can effect the transaction using currencies local to the purchasers but different than that used by the seller if the seller is located in a different country.

In one embodiment, if the consumer does not complete the transaction within the allocated number of days, the agent computing system can optionally cancel the transaction at operation 152, and at operation 154 optionally notify the payment gateway, or the merchant directly, that the transaction has been cancelled. At operation 156, the merchant optionally notifies the consumer that the transaction was cancelled due to the buyer's failure to provide a timely payment, and further that no goods will be shipped or services provided in accordance with the transaction.

Figure 4:
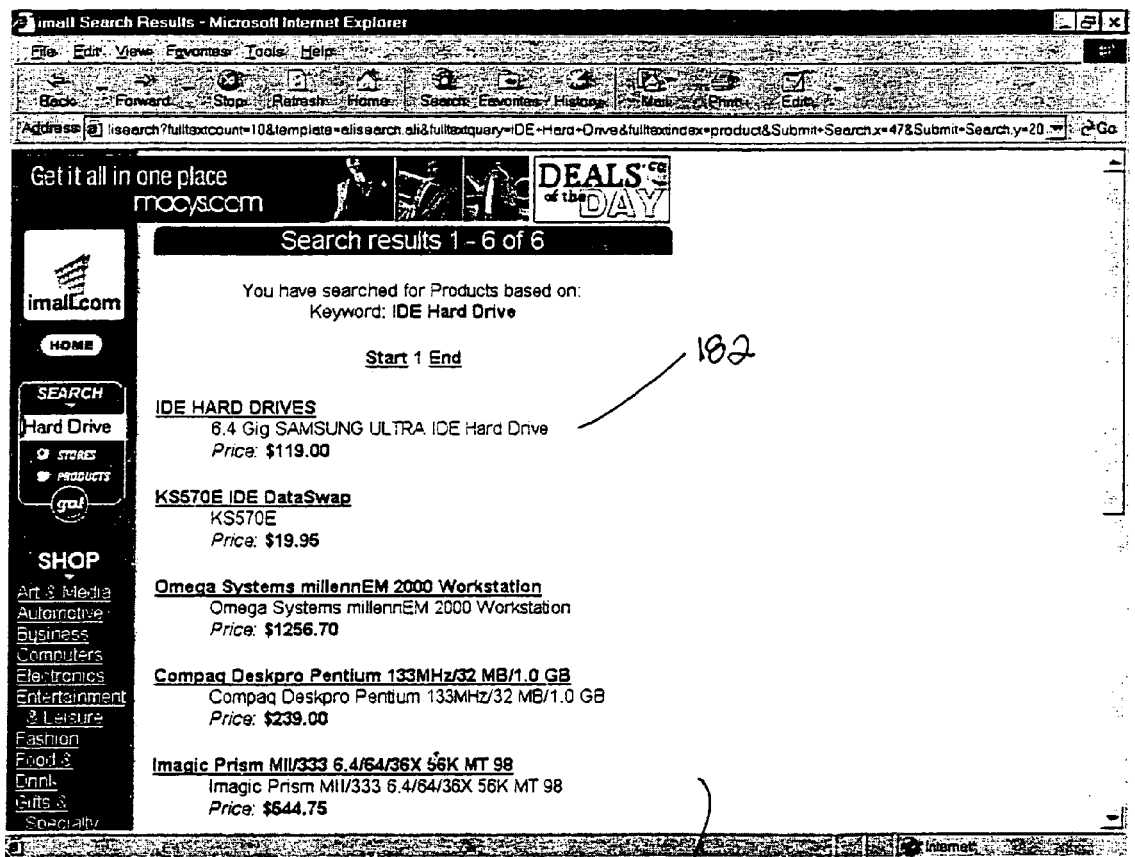
FIG. 4 illustrates a computer screen wherein an example of a merchant's web site is shown and the buyer/consumer has selected an item to purchase by an electronic transaction over the Internet.
Figure 5:
FIG. 5 illustrates a computer screen wherein an example of a merchant's web site is shown and the buyer/consumer has entered shipping information for the electronic transaction of FIG. 4.

FIGS. 4-7 illustrate examples of display screens as displayed to a purchaser through the merchant's web site. Referring to FIG. 4, an example merchant's web site 180 is shown with an item 182 for purchase. Referring to FIG. 5, the merchant's web page 180 is shown which queries for shipping information 184A from the buyer, including the buyer's name, the buyer's address, the buyer's country, and other information such as the buyer's telephone number. The buyer provides that information to the merchant through shipping web page 180 of FIG. 5.

Product and shipping cost field 186 indicates the subtotal for the purchase of the items 182. Web page 180 of FIG. 5 preferably includes an indication of the number of items being purchased and the cost per item, as well as the shipping costs associated with the transaction.

Figure 6A:
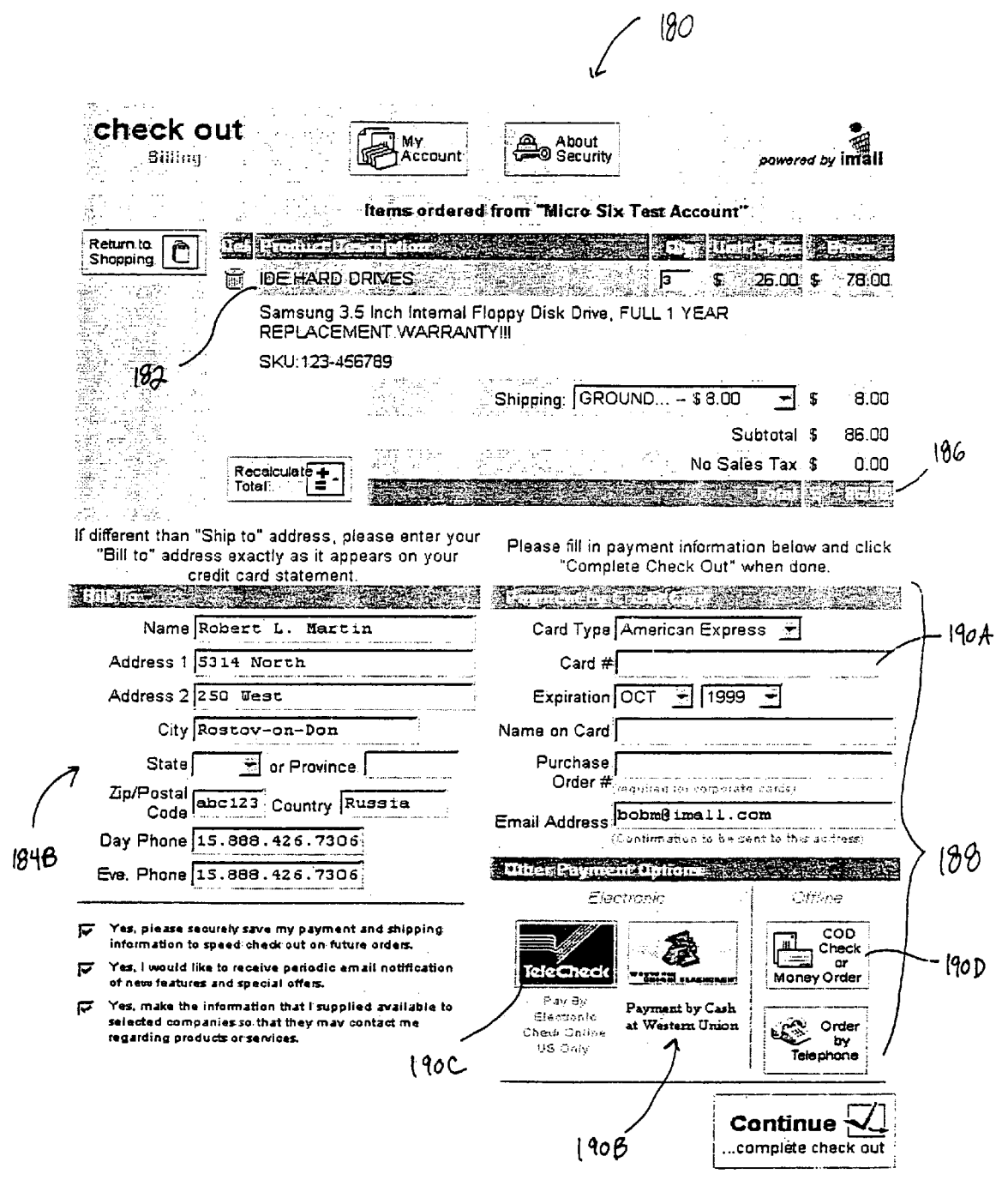
Figure 6B:

Referring to FIGS. 6A-E, the merchant's web site then displays a series of web pages regarding the electronic payment in accordance with one embodiment of the present invention. Referring to FIG. 6A, the merchant web page 180 displays the information 182 about the item(s) selected for purchase by the buyer, fields 184B regarding billing information, field 186 showing the cost of the items and shipping, and payment method fields 188 having a variety of user selectable fields 190A, 190B, 190C, 190D which provide the user with various payment methods. In accordance with the present invention, the user selectable field 190B provides the buyer with the option to pay for the transaction using the methods described herein.

Upon the user selecting the electronic payment method association with field 190B, the information is displayed to the buyer about the transaction so that the buyer can proceed with completing the transaction using the electronic payment method of the present invention.

Figure 7B:

Referring now to FIG. 6B, the merchant web page displays further information regarding the electronic payment method of the present invention. A payment method indicator field 192 indicates and confirms to the buyer that the electronic payment method of the present invention has been selected. A link 194 is provided for information regarding the electronic payment method so that the purchaser can obtain information, details, and answers to frequently asked questions. A link 196 provides the buyer with information relating to the geographic addresses of the agent locations where the buyer can complete the transaction. For instance, as shown in FIG. 7A, information regarding agent locations can be provided to the user in geographic locations specified by the user. More specific information about a particular agent location can also be provided, such as the information shown in FIG. 7B.

Referring back to FIG. 6B, merchant web page 180 also displays exchange rate information 198 between the currency of the seller and the currency local to the buyer. A purchase total field 200 is expressed in the local currency and converts the amount in field 186 (cost of the items being purchased plus shipping costs, as expressed in the seller's currency) into an amount expressed in the local currency of the buyer.

A transaction fee field 202 indicates the cost to the buyer for using the electronic payment service provided by the agent computing system and the plurality of agent locations. In one example, the transaction fee field is expressed in the local currency of the buyer. A grand total field 204 indicates the total amount to be paid by the buyer to the agent location nearest the buyer, in order to complete the transaction. Preferably, the grand total field 204 is expressed in the same currency as used by the buyer. In one example, the amount shown in fields 200, 202 and 204 are based upon a current exchange rate and calculated by the agent computing system at the time the transaction is being processed thereby. By expressing the product prices in the currency of the seller and the purchase costs (i.e., fields 200, 202 and 204) in the currency of the buyer, international transactions are more easily facilitated by the present invention.

A "complete checkout" user-selectable control 205 is provided so that the buyer can complete the on-line portion of the transaction. Upon the user selecting the control 205, the transaction is processed and information regarding the transaction obtained from the merchant's web pages (i.e., FIGS. 5 and 6A-B) is sent to the agent computing system/money transfer system 48 and processed therein, as described in operations 116, 118, and 120 in FIG. 2 and operations 130, 132, and 134 of FIG. 3. After the agent computing system has assigned a confirmation number to the transaction and compiled the other information regarding the transaction, the agent computing system communicates this information to the merchant's server for communication to the buyer as shown in FIGS. 6C-D. In FIGS. 6C-D, the merchant's web site displays an "order confirmation" page which contains a variety of information fields. A confirmation number field 208 is displayed within the order confirmation page which shows the transaction number created by the agent computing system and uniquely assigned to this transaction. A shipping information field 184A contains the shipping data as previously specified by the buyer, and billing information 184B specified by the buyer is also preferably displayed.

An instruction field 206 is also displayed within an "order confirmation" section of the merchant's web page 180 (shown in FIG. 6C). The instruction field 206 preferably indicates that the buyer should print a copy of the order confirmation page, or at a minimum write down the confirmation number shown in field 208, for later use. The buyer is instructed to take this information, together with the payment, to the nearest agent payment location. A link 196 to a list of the nearest agent payment locations is also provided on page 180, for ease of use by the buyer. An information link 194 about the electronic payment method can also be displayed within page 180 of FIGS. 6C and 6D.

While FIGS. 6A-D show a number of fields and links containing a variety of information, it is understood that the information can be displayed in different combinations or throughout one or more web pages of the merchant's web site, and additional information can be provided as well, if appropriate. For example, contact information regarding the seller, such as the seller's e-mail address, toll-free telephone number, fax number, web site address, and/or mailing address can also be included in the confirmation page display.

Figure 8:
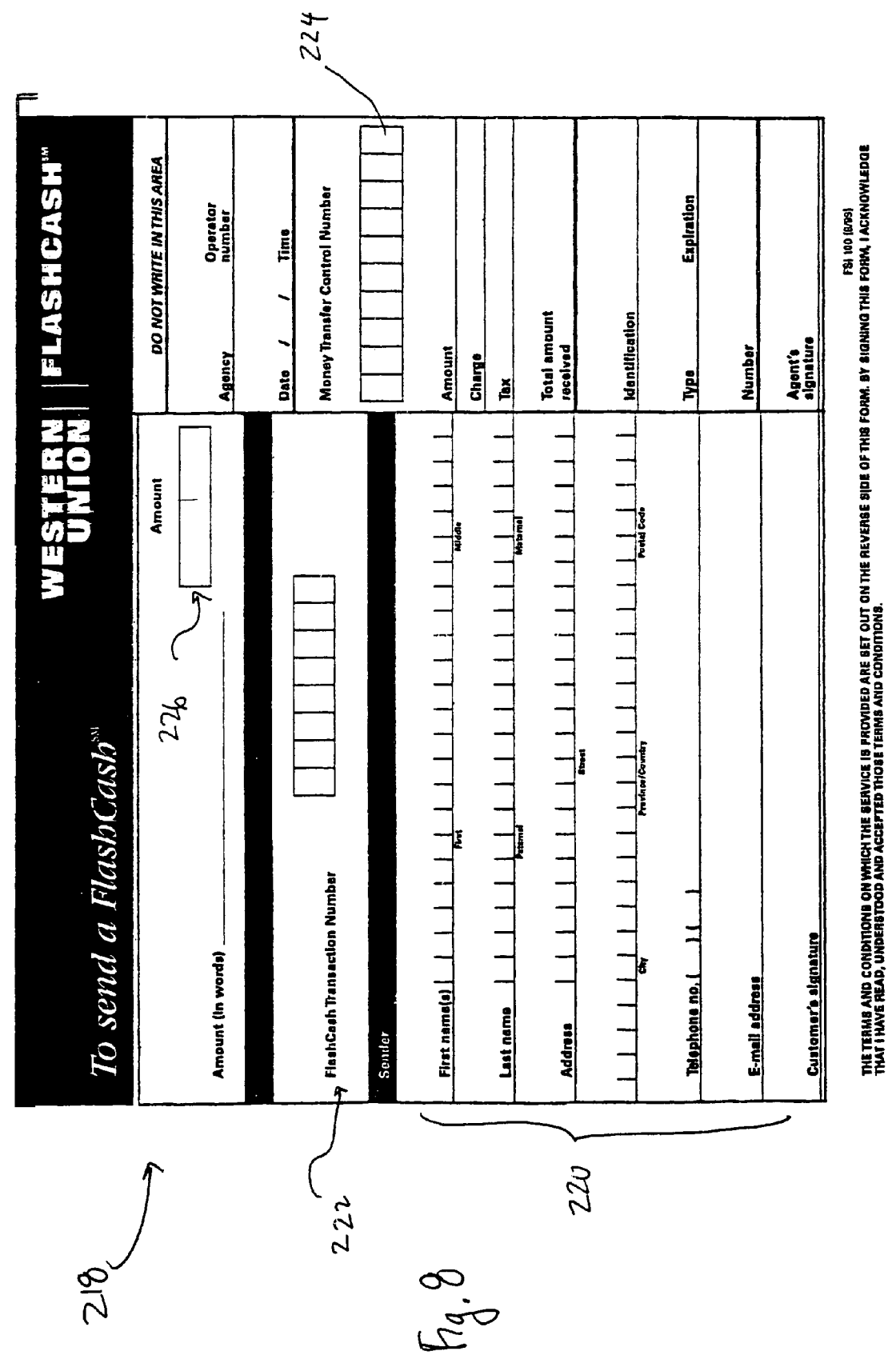

Upon the buyer making payment for the transaction at an agent payment location, a money transfer form can be generated by the agent payment location or by the agent computing system for transmission to the merchant seller. An example of such a money transfer form 218 is illustrated in FIG. 8. The form contains a sender field 220, identifying the name and address of the buyer. A confirmation number field 222 is also indicated, as well as an optional order number field 224 corresponding to an order number specified by the merchant for identifying the transaction. This order number field 224 is communicated by the merchant's web server to the agent computing system as part of the information communicated regarding the transaction when an electronic payment transaction is initially requested.

A total amount paid field 226 is also indicated on the money transfer form 218 which indicates the amount of money paid by the buyer at the agent payment location.

Preferably, each Internet merchant adapts their web site to include an electronic payment option in accordance with the present invention. The merchant and the entity operating the agent computing system and the plurality of agent locations would agree to the terms and conditions of the services being offered by the entity. The entity could then add and register the merchant within the agent computing system, as well as within the plurality of agent locations, so that the processing of the electronic payment transactions is simplified.

While the methods of the present invention have been described with respect to computerized transactions initiated by a buyer over the Internet, it is understood that the same method could be applied if the buyer initiates the transaction using other sources. For example, a buyer could communicate with the merchant and place an order by telephone or fax, wherein the merchant would then generate an electronic payment transaction request as described above. Additionally, a variety of computing input devices usable by the buyer are contemplated, including a conventional personal computer having web browsing capabilities, a cellular phone or personal digital assistant having web browsing capabilities, or a kiosk or other computer input device computing with the merchant's server over a computer network such as the Internet.

Figure 9:
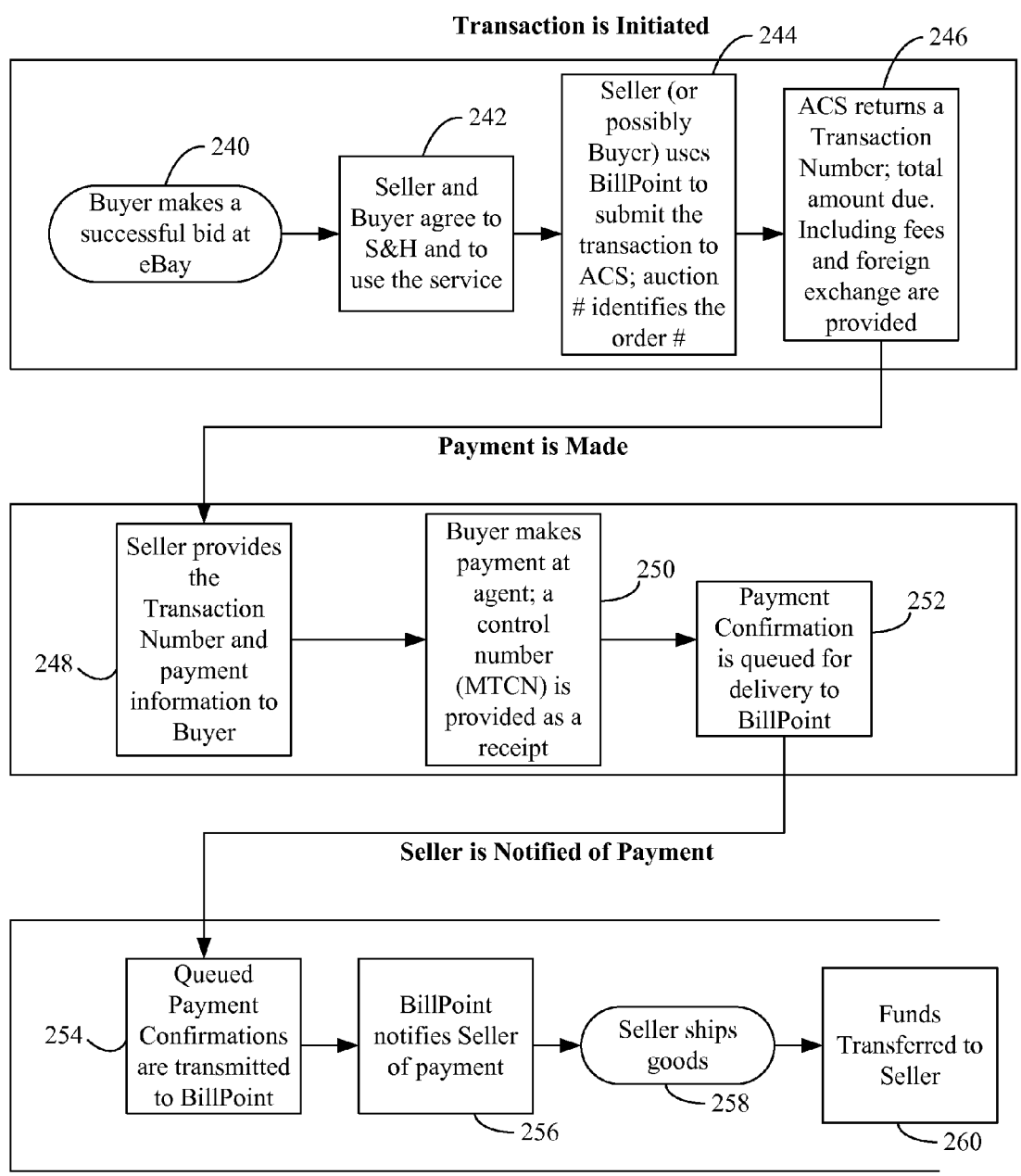
FIG. 9 illustrates the logical operations of an alternative embodiment of the present invention for a buyer to select the payment method for a computerized transaction with a seller who uses a bidding process on the web site, in accordance with one embodiment of the present invention.

The methods of the present invention have been described with respect to a merchant having a merchant server which controls the merchant's web page or virtual storefront. However, the methods of the present invention can also be used to facilitate transactions between a buyer and a non-merchant seller, such as an individual selling an item on an auction web site (e.g., eBay.com). In FIG. 9, the eBay auction web site is used as an example, along with the billpoint person-to-person credit card payment service provided on the eBay web site.

In the example of FIG. 9, it is assumed that the BillPoint service has made the electronic payment method of the present invention available to the seller and buyer on eBay as one of the payment choices. Referring to FIG. 9, at operation 240 the buyer places a successful bid on the eBay web site, where the seller has listed an item for sale by auction. At operation 242, the seller and buyer agree to use the "Flash-Cash" electronic payment of the present invention as the method of payment for the auction transaction.

At operation 244, the seller or buyer uses the BillPoint service of eBay to submit the transaction to the agent computing system shown in FIG. 1. Information regarding the auction is passed to the agent computing system, such as the names and addresses of the buyers and sellers, the item purchased, the price preferably including shipping costs, the auction number, and the date.

At operation 246, the agent computing system assigns a unique confirmation number to this transaction, and communicates this confirmation number to the seller. Operation 246 also communicates the total amount owed payable by the buyer, and can express this amount in a local currency if appropriate, as previously described. At operation 248, the seller provides the transaction number and other payment information to the buyer, and at operation 250, the buyer pays the specified payment amount to the agent at one of the agent locations.

At operations 252-254, confirmation of the payment is communicated from the agent computing system to BillPoint on eBay in order to notify the seller of the buyer's payment. At operation 256, BillPoint notifies the seller that the payment was made by the buyer, so then at operation 258 the seller can ship the goods to the buyer. At operation 260, the funds received at the agent location for the purchase price and shipping costs are transferred to the seller under the direction of the agent computer system. As indicated previously, the funds can be transferred in a currency usable by the seller which is different from the currency used by the buyer.

Figure 10:
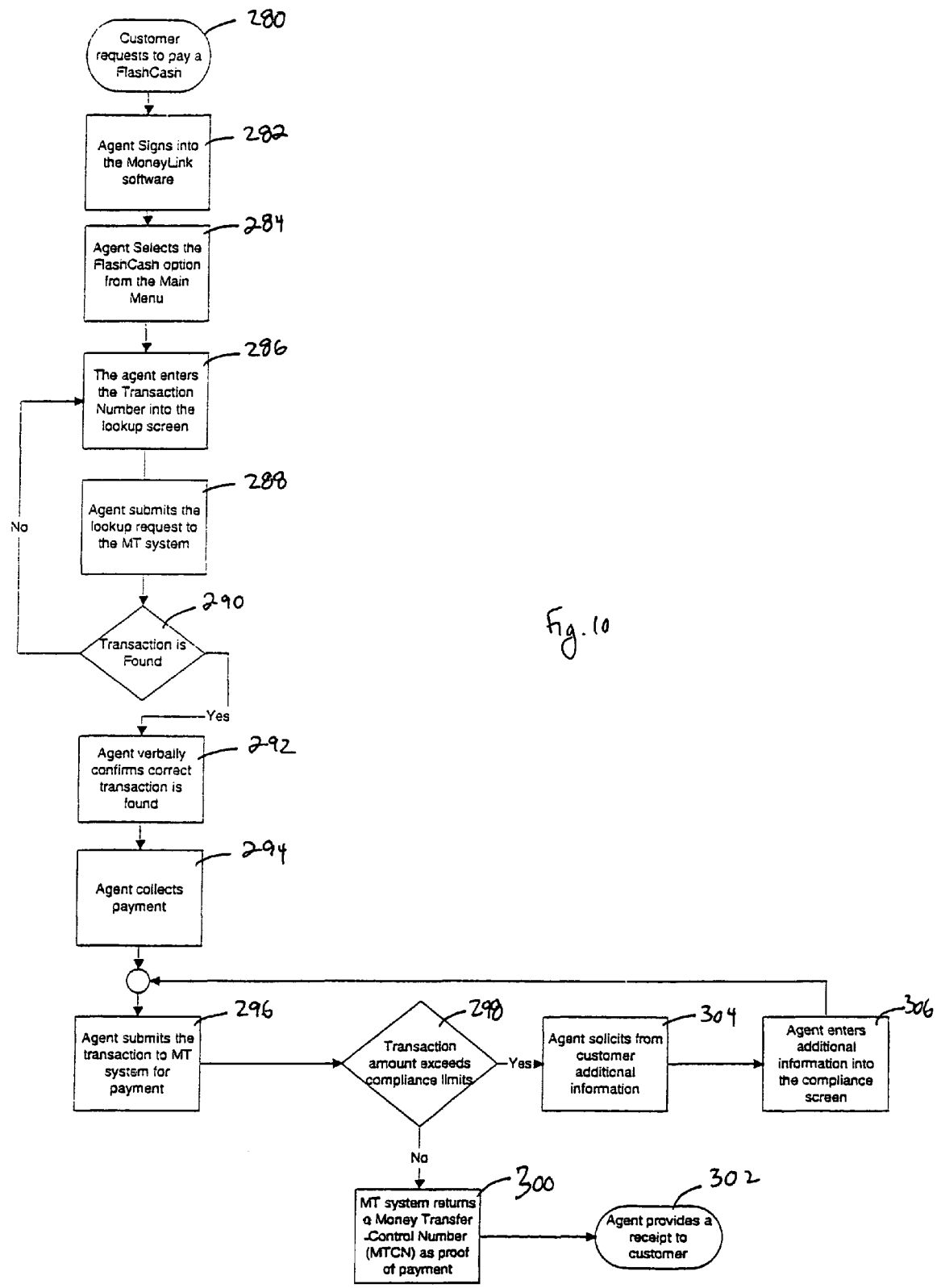
FIG. 10 illustrates the logical operations performed by an agent location in order to process an electronic payment transaction in accordance with one embodiment of the present invention.

Upon completion of the online portion of the transaction by the buyer, the agent computing system/money transfer system 42 makes the transaction record available for access by any one of the plurality of agent locations 48 in order to complete the transaction. In particular, the transaction is completed after the buyer visits an agent location and tenders payment for the transaction, at which time the agent location accesses the transaction records stored at the agent computing system/money transfer system 42. FIG. 10 illustrates the logical operations performed at the agent location for completing the transaction.

At operation 280 of FIG. 10, a buyer visits an agent location and requests to complete the transaction by tendering payment (i.e., paying the grand total amount indicated in field 204 of FIG. 6C). At operation 282 and in one example, the local agent at the agent location initiates software operating on the agent's local computer. As will be described with reference to FIGS. 14 and 15, the agent's local computer can be simple or complex, and is preferably coupled to a network in communications with the agent computing system/money transfer system 42. At operation 284, the local agent initiates software operations which are adapted to obtain information regarding the electronic payment transaction particularly specified by the buyer at operation 280. At operation 286, the local agent enters the transaction number/confirmation number (i.e., the transaction number indicated in field 208 of FIG. 6D) into a query screen, and operation 288, the local agent submits the query/request to the agent computing system/money transfer system 42.

Upon receiving the local agent's query/request, the agent computing system/money transfer system 42 then searches its database for information relating to the transaction identified by the transaction/confirmation number specified by the local agent at operation 286. If the transaction is found, decision operation 290 passes control to operation 292. If, however, the transaction is not found, decision operation 290 informs the local agent that the specified transaction number is invalid, whereupon the local agent can repeat operations 286-288 with a different transaction number.

Preferably, operations 282-288 are performed by a local agent having a computing system connected over a network to the agent computing system/money transfer system 42. It is understood, however, that operations 282-288 could be performed by a local agent communicating with the agent computing system/money transfer system 42 via facsimile, telephone, or other like means. Furthermore, it is understood that the local agent functions could be integrated within the software of an automatic teller machine (ATM) or other like system.

At operation 292, the local agent can optionally verbally confirm, with a person having access to the records of the agent computing system/money transfer system 42, or with the buyer, that the correct transaction has been found.

At operation 294, the local agent collects payment from the buyer for the transaction. The amount of the payment collected is preferably in the currency local to the buyer, and preferably corresponds to the amount specified in field 204 of FIG. 6C.

At operation 296, the local agent then submits a message or record to the agent computing system/money transfer system 42 indicating that the buyer has tendered the payment for the transaction and that the local agent has received such payment.

Operation 298 determines if the transaction amount exceeds compliance limits (e.g., Texas compliance limit of $1,000 on international transfers). If not, then control is passed to operation 300 wherein the agent computing system/money transfer system 42 returns a money transfer control number to the local agent. The money transfer control number provides proof of payment for the buyer's records as well as the records of the local agent. At operation 302, the local agent provides a receipt to the buyer indicating that the transaction has been completed. The receipt, in one example, is preferably in the form as shown in FIG. 8.

If operation 298 determines that the transaction amount exceeds the compliance limits, then control is passed to operation 304 wherein the local agent solicits additional information from the buyer (e.g., occupation, social security number, and/or other identification). At operation 306, the local agent enters the additional information into the local agent's computing system and transmits this information to the agent computing system/money transfer system 42 for processing therein and approval thereof.

Upon completion of the transaction at operations 296, 300 and 302, the agent computing system/money transfer system 42 transmits a message to the merchant's computing system indicating that payment for the transaction has been received by the local agent 48. The agent computing system/money transfer system 42 preferably transfers funds to the merchant in the amount of the cost of the goods plus the cost of shipping, discounted by any transaction fees charged to the merchant. Preferably, the money transferred to the merchant is transferred in the currency specified by the merchant. The merchant ships the goods purchased by the buyer to the buyer at the buyer's shipping address (for example, as specified in field 184 of FIG. 6D). The entire transaction is then complete.

Figure 11:
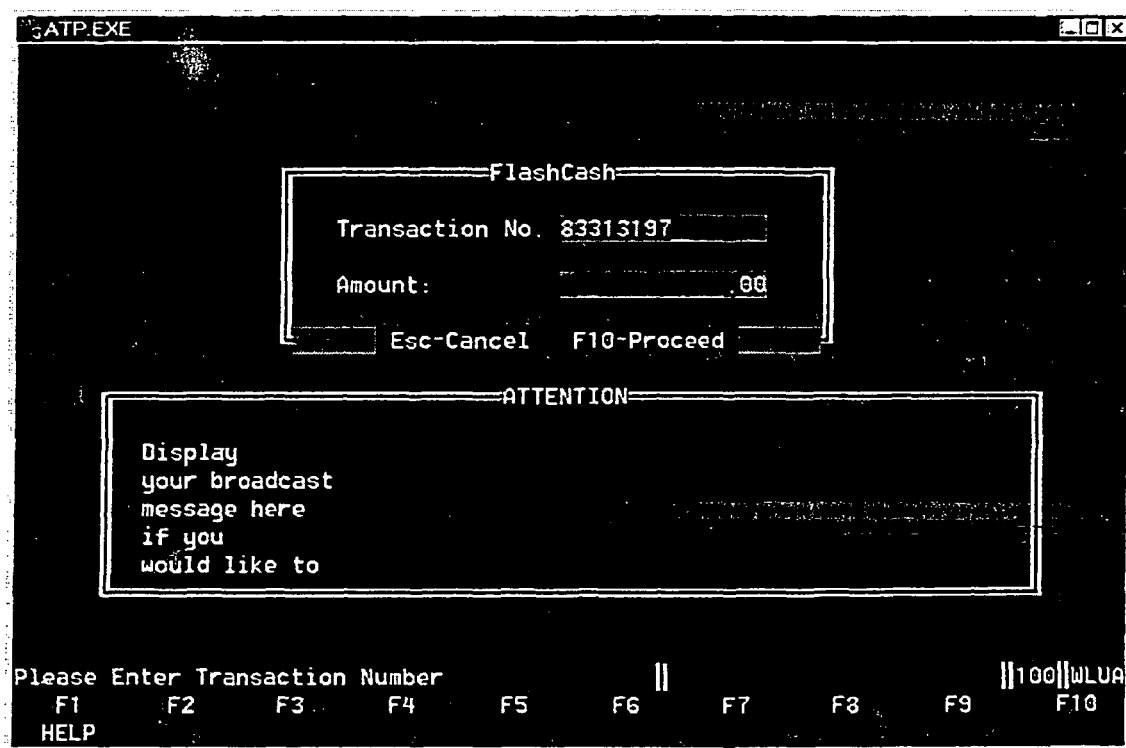
FIGS. 11A-11C illustrate exemplary computer screen displays of a computer operating at the agent location.
Figure 11B:
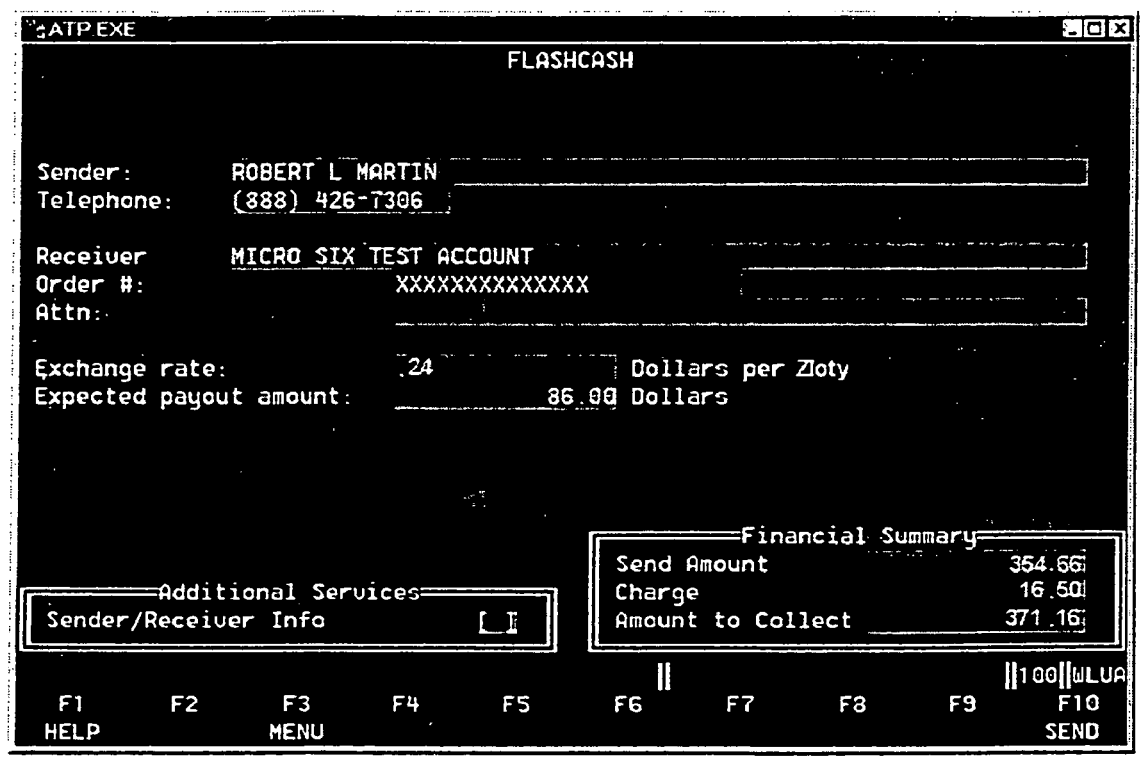
Figure 11C:

FIGS. 11A-11C illustrate exemplary computing screen displays at a local agent. As shown in FIGS. 11A-11C, a variety of information relating to the transaction is made accessible to the local agent. Referring to FIG. 11A, the local agent enters the transaction number which the buyer presents to the local agent (i.e., the transaction number specified in field 208 of FIG. 6D). In FIG. 11B, the local agent is then provided with information relating to the transaction, including information relating to the buyer, and information relating to the seller. Further, the exchange rate can be displayed, as well as a financial summary indicating the amount to collect from the buyer.

In FIG. 11C, after the local agent has received payment from the buyer, the local agent transmits a message to the agent computing system/money transfer system 42 that the payment has been received. In response, and as shown in FIG. 11C, a money transfer control number is generated by the agent computing system/money transfer system 42 and communicated to the local agent 48. The local agent then provides this money transfer control number to the buyer as proof of the buyer's payment.

Preferably, a message delivery queuing system is used to communicate messages between, for instance, the merchant's computing system 34, the agent computing system/money transfer system 42, and one or more agents at agent locations 48. The delivery queuing system is preferably implemented across the software devices employed by the merchant's computing system 34, the agent computing system/money transfer system 42, and one or more agents at agent locations 48. As described herein and depending on the flow direction of a particular message, the merchant computing system 34, the agent computing system/money transfer system 42, and one or more agents at agent locations 48 can be senders or receivers of a message.

The queuing system separates the many pieces of a messaging system to allow independent customization at the point where it is needed. The form and method of the initial capture are not captive to the output format or technology. The messages may be in any of several formats depending on sender preferences, receiver requirements, message type, output hardware and communications protocol. The receiver (in one example, the agent at the agent location 48) preferably may receive the message directly from the money transfer system 48, or it may be delivered through some other delivery system. The message output may occur as soon as possible after receipt of another message or it may be scheduled to match the receiver's hours of operation.

The queuing system allows for the initiation of several output messages as a consequence of actions taken on a money transfer or message. The sender is relieved of the knowing many of the delivery requirements of the receiver even if the delivery mechanism should change between receipt of the input and the delivery of the output.

The output message sent to the receiver is delivered singly during the hours specified or in a batch as specified by the receiver. The message output may be routed directly upon selection of this receiver by the sender at recording time. Alternatively, the sender may provide the message type and the receiver's address and the system will route the output through a third party delivery system, for example.

Each sender interaction with the system is captured in one of two types of message records. These records contain the sender information, identify the recipient and the means to get the message to the recipient, and the message itself. Preferably, each of these records is uniquely identified by a control number, and duplicate control numbers are not allowed. Valid control numbers are guaranteed to identify exactly one message record.

The delivery queuing system is preferably implemented using CODASYL database structures and memory resident data extracted from these records. Using the member-owner relationship, sorted sets, and key data that uniquely identifies records, an efficient and highly controllable mechanism is built. The queuing system preferably functions in real time.

Each "client" computing system (i.e., the merchants' computing system or the computing system operating at the agent location 48) or third party delivery system is uniquely identified within the system as a "client" record. These message recipients can be made available to the sender via a pull down list of aliases shown at recording time. In one example, third party delivery systems are not explicitly identified by the sender but are merely the vehicle through which a message will be routed.

Figure 12:
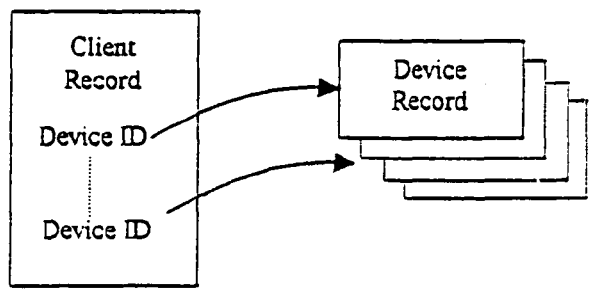
FIG. 12 illustrates an example schema for the message delivery queuing system in accordance with one embodiment of the present invention.

As shown in FIG. 12, within the client record is a list of device identifiers to which the output for this client should be queued. Each of these device identifiers is the key to a "device" record. The device record reflects the format in which the message is to be delivered to the receiver. Device records are also configured as being in a certain "class" as determined by the needs and limits of the client's receiving mechanism. Depending on the capabilities of the client, the device record may allow only one or several message deliveries to be outstanding at any time depending in part upon the sophistication and technology of the computing systems involved and the volume of traffic. Each record allows for delivery times to be customized to serve the needs of the client.

Preferably, the memory image of the device record is updated whenever the database device record is updated. This may be through a database maintenance routine update, the arrival of a new item for delivery to this device, moving an item to the "delivery in progress" queue, or completion of the delivery, for example.

Figure 13:
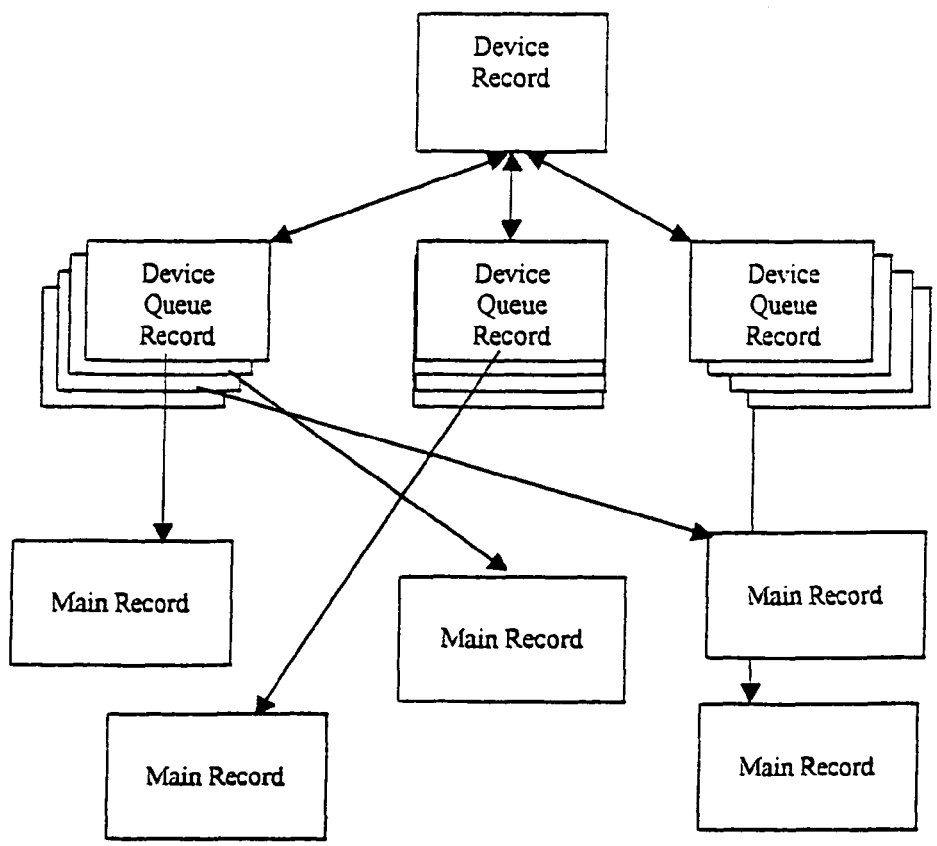
FIG. 13 illustrates device queue records of the message delivery queuing system in accordance with one embodiment of the present invention.

As shown in FIG. 13, in one example, attached to the device record are three ordered sets of "device queue" records. Messages are queued for delivery through this device by placing the unique message control number in a device queue record that is owned by the device record. These three sets represent messages awaiting delivery, messages currently being delivered, and messages awaiting confirmation of delivery.

Senders may put messages into the system through several channels. For example, a voice-originated message may be entered via a terminal operated by an operator. Alternatively, an agent may enter the message using a terminal located at his storefront. Individual messages may be collected together and delivered to the agent computing system/money transfer system 42 from a third party messaging business. Preferably, all sources connect to the agent computing system/money transfer system 48 by way of one of the network nodes.

Depending upon the client or third party receiver's volume and level of technology, delivery of the message may be done on an item by item basis or a bulk delivery may be done at specified intervals during the day.

Figure 14:
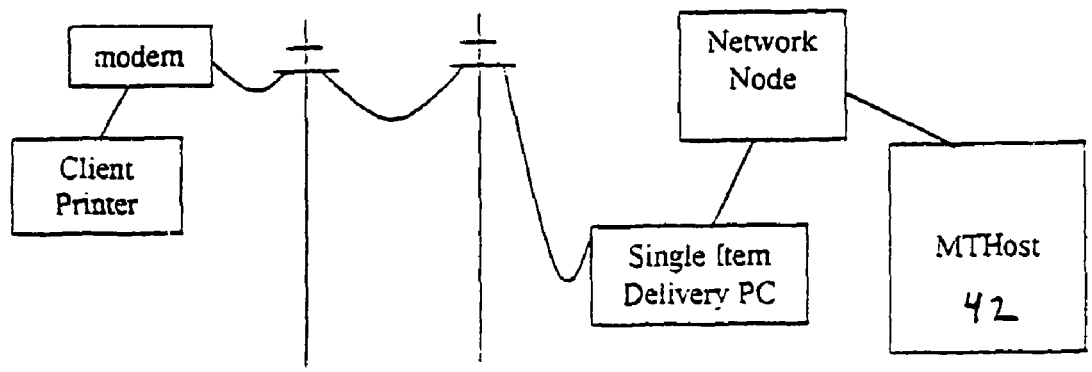
FIG. 14 illustrates an example of a delivery mechanism for the agent computing system to communicate with an agent location, in accordance with one embodiment of the present invention.

As shown in FIG. 14, smaller clients with low technology levels and low volumes may be set up with a modem and a printer, for example, to act as single item delivery boxes. The printer may be loaded with special paper, check stock for instance. A personal computer for example, with up to 28 output ports configured, acts as a single item delivery computer and requests work based on its configuration parameters and port availability. These parameters match the class of the device record. The single item delivery computer communicates with a Network Node via a high-speed LAN connection.

Figure 15:
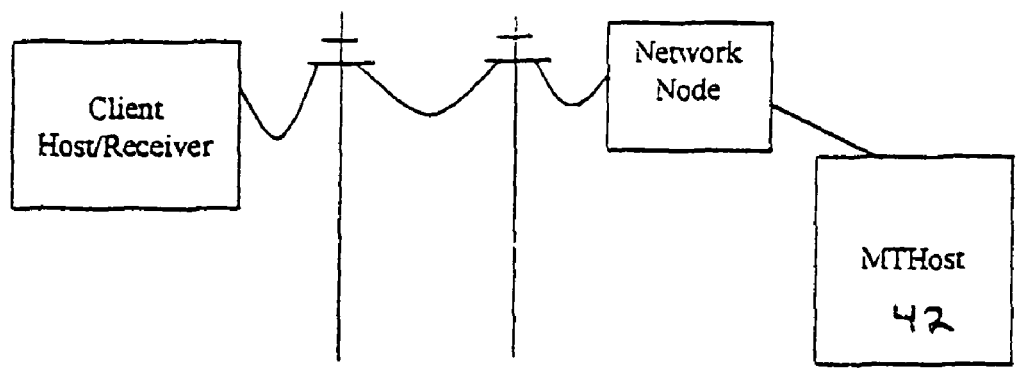
FIG. 15 illustrates an example of a delivery mechanism for the agent computing system to communicate with an agent location, in accordance with one embodiment of the present invention.

As shown in FIG. 15, for bulk delivery of messages, large volume clients may receive a file containing any number of message items using higher speed connections. These deliveries may be scheduled to occur several times per day and at times depending upon the day of the week. For these clients, the network node stands in for the single item delivery box and periodically requests the messages from the database server. The messages are collected until the first message recording time which occurs after the opening of a delivery window.

As shown in FIGS. 14 and 15, the network nodes provide security for the database server of the agent computing system/money transfer system 42.

Preferably, all delivery system interactions occur through a network node, and there are several network nodes and each backs up the other nodes to provide a robust, reliable network with extremely high availability.

Preferably and in one example, the agent computing system/money transfer system 42 is implemented as a plurality of delivery computers coupled to a database server with a money transfer host computer coordinating operations. The database server is the repository for the message records, and ensures delivery of each record, tracks the time delay between recording and delivery, forces delivery in order of recording, extracts the relevant data to be included in the output message, and allows for redelivery of an item where necessary. The message delivery process is initiated by the delivery computers connected to the database server via network nodes or by the network nodes themselves. Each delivery box and network node can request work from different classes of devices. This allows load balancing, redundancy and efficient use of limited hardware. Positive acknowledgement of delivery of a message by the delivering computer to the database server causes the queued item to be removed from the queue and marked as delivered. The network nodes offer other methods of connectivity and larger bandwidth for bulk delivery of items.

Each delivery computer is preferably configured with several modems and communications lines, with each of these ports configured for a class of traffic which identifies modem speed and type. When the port is available for work, the delivery computer requests a delivery item for that class, and this request is passed by the network node to the money transfer host computer of the agent computing system/money transfer system 48.

Preferably, the money transfer host computer processes single item and bulk delivery requests independent of the others wherein several threads of execution of the same routine may run concurrently with the class of work requested determining which of these routines is executed.

A delivery acknowledgement may be included in the request for work. This acknowledgement contains the control number of the delivered item and provides a positive indication of successful delivery to the receiving device. On the money transfer host computer, the delivery acknowledgement causes the device queue record for the just delivered item to be removed from the queue and the main record to be updated with a delivered status. The acknowledgement may also indicate that no more deliveries can be attempted on this device on this connection. This would be, for example, due to the receiving device capacity limitations.

If the receiving device class and the number of deliveries completed on this connection indicate that another item may be delivered, the awaiting delivery queue for this device is examined. If there is another item on the queue, it is selected for delivery and the device record status is updated to reflect this. If there are no more items on the queue, a "no work" response is returned to the requesting delivery computer.

The money transfer host computer preferably maintains a list of all the single item delivery devices in memory along with the device class, number of items queued for delivery, delivery hours, and the device status. When a request for work comes in, a search is performed through the list of devices from the device record which was last selected. The first device in the specified class, with device queue records on the awaiting delivery queue, and currently open for deliveries is selected and the device ID is passed to the requesting program.

The frequency of requests for work from an idle port diminishes as "no work" responses are returned by the money transfer host computer, which reduces the resources consumed processing non-productive inquiries.

For clients with large volumes and a richer assortment of technology it may be more practical to collect the single delivery items into files of several thousands. In this process, the network nodes stands in for the delivery computers and requests work for a specific client. There may be several deliveries in progress concurrently so that the data may be collected faster. These files are then sent to the money transfer host computer according to the needs of the receiving client. Preferably, the same process of marking a delivery queue item for "delivery in progress" and updating the main record occur for these items also.

Preferably aspects of the invention can be embodied in a computer program product, and aspects of the invention described herein can be implemented as logical operations in a computing system. The logical operations, or portions thereof, can be implemented (1) as a sequence of computing implemented steps running on the computing system and (2) as interconnected machine modules within the computing system. The implementation is a matter of choice dependent on the performance requirements of the computing system implementing the invention. Accordingly, the logical operations making up the embodiments or aspects of the invention described herein are referred to variously as operations, steps, or modules.

While the methods disclosed herein has been described and shown with reference to particular steps performed in a particular order, it will be understood that these steps may be combined, sub-divided, or re-ordered to form an equivalent method or methods without departing from the teachings of the present invention. Accordingly, unless specifically indicated herein, the order and grouping of the steps is not a limitation of the present invention.

While the invention has been particularly shown and described with reference to a preferred embodiment thereof, it will be understood by those skilled in the art that various other changes in the form and details may be made without departing from the spirit and scope of the invention.

We claim:

1. In an online commerce system including a buyer computer operated by a buyer, a seller computer operated by a seller, a network for connecting the buyer computer and the seller computer for an electronic commercial transaction, a method for effecting a payment from a buyer to a seller in connection with an electronic transaction utilizing a money transfer system, comprising:

providing a money transfer system connected for electronic communications with at least the seller computer, wherein the money transfer system is operative for electronic communications with one or more buyer accessible payment location local computers operated at one or more payment locations and physically accessible to the buyer to make a payment;

receiving at the money transfer system an electronic payment request from the seller computer in response to a proposed transaction between the buyer and the seller, the payment request comprising information including at least a transaction amount;

assigning, by the money transfer system, a unique transaction number to the payment request without receiving card account information or financial account information associated with the buyer, wherein the unique transaction number is associated with the transaction between the buyer and the seller;

determining by the money transfer system a preliminary total amount required from the buyer in connection with the transaction comprising at least the transaction amount;

determining by the money transfer system a grand total amount based upon the preliminary total amount and any other applicable charges;

communicating information from the money transfer system to the seller computer system for displaying at least the grand total amount and the unique transaction number to the buyer computer system;

receiving at the money transfer system a payment notification associated with the unique transaction number from the payment location local computer, wherein the payment notification indicates payment in the amount of the grand total amount has been submitted in person at the payment location by or on behalf of the buyer, wherein the amount of the grand total amount is submitted after the unique transaction number is assigned;

communicating a message to the seller computer system that payment associated with the unique transaction number has been received at a payment location upon receipt of the payment notification by the money transfer system; and effecting completion of the electronic payment request by making payment via the money transfer system to the seller upon receipt of the payment notification by the money transfer system.

2. The method of claim 1, wherein the payment location local computer is a stand-alone computing system with money transfer capabilities.

3. The method of claim 1, wherein payment to the seller comprises the grand total amount expressed in the local currency of the seller, less any applicable transaction fees.

4. The method of claim 1, further comprising the step of determining a buyer local exchange rate for the preliminary total amount based upon buyer information provided from the buyer computer system to the seller computer system, and thence to the money transfer system.

5. The method of claim 4, wherein the buyer information comprises buyer address information including a country.

6. The method of claim 4, wherein the step of determining the grand total amount comprises determining the grand total amount expressed in the local currency of the buyer based on the determined buyer local exchange rate.

7. The method of claim 1, wherein the seller computer displays a plurality of selectable payment methods for selection by the buyer in connection with the transaction, the payment methods including a cash payment method, and wherein the payment request is generated by the seller computer system in response to selection by the buyer of the cash payment method.

8. The method of claim 1, wherein the payment request information includes information selected from the group comprising buyer identification information, seller identification information, seller order number, transaction date, a summary of item(s) purchased, purchase price, shipping charges, and total price.

9. The method of claim 1, wherein the preliminary total amount comprises the sum of the transaction amount, shipping charges, and any applicable transaction fees.

10. The method of claim 1, further comprising the step of generating a unique data record corresponding to the payment request and storing the data record in a staging area associated with the money transfer system.

11. The method of claim 10, further comprising the step of storing the data record in a payment confirmation queue in response to receipt of the information from the payment location that payment has been actually made at the payment location.

12. The method of claim 1, wherein payment to the seller is made by the steps of:

determining a seller local exchange rate for the funds due to the seller based upon seller information provided by the seller computer; and determining a grand total amount expressed in the local currency of the seller, based upon the grand total amount and the determined seller local exchange rate, less any applicable charges.

13. The method of claim 1, further comprising the step of determining whether an amount associated with the transaction exceeds a predetermined compliance limit, and requesting additional information from the buyer in response to a determination that said amount exceeds the predetermined compliance limit.

14. The method of claim 1, further comprising the step of, in further response to information from a payment location local computer that payment in the amount of the grand total amount has been received at the payment location, communicating a money transfer control number (MTCN) to the payment location for provision to the buyer.

15. The method of claim 14, further comprising the step of providing a receipt to the buyer at the payment location, the receipt bearing at least the money transfer control number (MTCN).

16. The method of claim 1, wherein the payment made by the buyer at the payment location is by cash, credit card, or check.

17. The method of claim 1, wherein the information provided in the step of communicating information to the seller computer system for displaying to the buyer computer system includes instructions to the buyer that payment in the grand total amount should be tendered to a payment location.

18. The method of claim 1, wherein the information provided in the step of communicating information to the seller computer system for displaying to the buyer computer system includes information as to a plurality of payment locations at which actual payment may be tendered.

19. The method of claim 1, wherein a payment gateway is positioned to communicate information between the seller computer and the money transfer system.

20. The method of claim 1, further comprising the step of canceling the transaction if the buyer does not make payment at a payment location within a predetermined time period.

21. The method of claim 1, wherein the payment request includes an order number provided by the seller computer.

22. The method of claim 1, wherein the seller is a merchant and operates an Internet-accessible web site for conducting transactions with buyer computers.

23. The method of claim 1, wherein the seller is a seller on an online auction system.

24. The method of claim 1, further comprising the steps of maintaining device queue records comprising lists of messages awaiting delivery, messages currently being delivered, and messages awaiting confirmation of delivery.

25. The method of claim 1, further comprising the step of accessing information stored at the money transfer system including the grand total amount due from the buyer, in response to receipt of a message from a payment location including the unique confirmation number, and communicating the grand total amount to the payment location.

26. In an online commerce system including a buyer computer operated by a buyer, a seller computer operated by a seller, and a network for connecting the buyer computer and the seller computer for an electronic commercial transaction, a system for effecting a payment from a buyer to a seller in connection with an electronic transaction, comprising:

a communication link for connecting a money transfer system to the seller computer;

a money transfer system operative for electronic communications with one or more buyer accessible payment location local computers operated at one or more payment locations and physically accessible to the buyer to make a payment;

the money transfer system operative for receiving an electronic payment request from the seller computer in response to a proposed transaction between the buyer and the seller, the payment request comprising information including at least a transaction amount;

the money transfer system operative for assigning a unique transaction number to the payment request without receiving card account information or financial account information associated with the buyer, wherein the unique transaction number is associated with the transaction between the buyer and the seller;

the money transfer system operative for determining a preliminary total amount required from the buyer in connection with the transaction comprising at least the transaction amount;

the money transfer system operative for determining a grand total amount based upon the preliminary total amount and any other applicable charges;

the money transfer system operative for communicating information to the seller computer system for displaying the grand total amount and the unique transaction number to the buyer computer system;

the money transfer system operative for receiving information from a payment location local computer at a payment location indicating that payment in the amount of the grand total amount has been received in person at the payment location by or on behalf of the buyer, wherein the amount of the grand total amount is submitted after the unique transaction number is assigned;

the money transfer system operative for communicating, when receiving said information, a message associated with the unique transaction number to the seller computer system that payment has been actually made at a payment location; and the money transfer system operative for effecting completion of the electronic payment request by making payment to the seller upon receipt of the payment notification by the money transfer system.

27. The system of claim 26, wherein the payment location local computer comprises a stand-alone computing system with money transfer capabilities.

28. The system of claim 26, wherein payment to the seller comprises the grand total amount expressed in the local currency of the seller, less any applicable transaction fees.

29. The system of claim 26, wherein the money transfer system is operative for determining a buyer local exchange rate for the preliminary total amount based upon buyer information provided from the buyer computer system to the seller computer system, and thence to the money transfer system.

30. The system of claim 29, wherein the buyer information comprises buyer address information including a country.

31. The system of claim 29, wherein the operation of determining the grand total amount comprises determining the grand total amount expressed in the local currency of the buyer based on the buyer local exchange rate.

32. The system of claim 26, wherein the seller computer is operative to communicate information to the buyer computer for display at the buyer computer of a plurality of selectable payment methods for selection by the buyer in connection with the transaction, the payment methods including a cash payment method, and wherein the payment request is generated by the seller computer system in response to selection by the buyer of the cash payment method.

33. The system of claim 26, wherein the payment request information includes information selected from the group comprising buyer identification information, seller identification information, seller order number, transaction date, a summary of item(s) purchased, purchase price, shipping charges, and total price.

34. The system of claim 26, wherein the preliminary total amount comprises the sum of the transaction amount, shipping charges, and any applicable transaction fees.

35. The system of claim 26, wherein the money transfer system is operative for generating a unique data record corresponding to the payment request and storing the data record in a staging area associated with the money transfer system.

36. The system of claim 35, wherein the money transfer system is operative for storing the data record in a payment confirmation queue in response to receipt of the information from the payment location that payment has been actually made at the payment location.

37. The system of claim 26, wherein the money transfer system is operative to make payment to the seller by:
   determining a seller local exchange rate for the funds due to the seller based upon seller information provided by the seller computer; and
   determining a grand total amount expressed in the local currency of the seller, based upon the grand total amount and the determined seller local exchange rate, less any applicable charges.

38. The system of claim 26, wherein the money transfer system is operative determining whether an amount associated with the transaction exceeds a predetermined compliance limit, and requesting additional information from the buyer in response to a determination that said amount exceeds the predetermined compliance limit.

39. The system of claim 26, wherein the money transfer system is operative, in further response to information that payment in the amount of the grand total amount has been received at the payment location, for communicating a money transfer control number (MTCN) to the payment location for provision to the buyer.

40. The system of claim 39, wherein the money transfer system is operative for providing information to the payment location including the MTCN, and wherein the payment location is operative for providing a receipt to the buyer at the payment location, the receipt bearing at least the money transfer control number (MTCN).

41. The system of claim 26, wherein the payment made by the buyer at the payment location is by cash, credit card, or check.

42. The system of claim 26, wherein the information provided to the seller computer system for displaying to the buyer computer system includes instructions to the buyer that payment in the grand total amount should be tendered to a payment location.

43. The system of claim 42, wherein the information provided to the seller computer system for displaying to the buyer computer system includes information as to a plurality of payment locations at which actual payment may be tendered.

44. The system of claim 26, further comprising a payment gateway positioned to communicate information between the seller computer and the money transfer system.

45. The system of claim 26, wherein the money transfer system is operative for canceling the transaction if the buyer does not make payment at a payment location within a predetermined time period.

46. The system of claim 26, wherein the payment request includes an order number provided by the seller computer.

47. The system of claim 26, wherein the seller is a merchant and operates an Internet-accessible web site for conducting transactions with buyer computers.

48. The system of claim 26, wherein the seller is a seller on an online auction system.

49. The system of claim 26, wherein the money transfer system is operative for maintaining device queue records comprising lists of messages awaiting delivery, messages currently being delivered, and messages awaiting confirmation of delivery.

50. The system of claim 26, wherein the money transfer system is further operative for accessing information stored at the money transfer system including the grand total amount due from the buyer, in response to receipt of a message from a payment location including the unique confirmation number, and for communicating the grand total amount to the payment location.

51. In an online commerce system including a buyer computer operated by a buyer, a seller computer operated by a seller, a network for connecting the buyer computer and the seller computer for an electronic commercial transaction, a method for effecting a payment from a buyer to a seller in connection with an electronic transaction utilizing a money transfer system, comprising:

providing a money transfer system connected for electronic communications with at least the seller computer, wherein the money transfer system is operative for electronic communications with one or more buyer accessible payment location local computers operated at one or more payment locations and accessible to the buyer to make a payment;

receiving at the money transfer system an electronic payment request from the seller computer in response to a proposed transaction between the buyer and the seller, the payment request comprising information including at least a transaction amount and buyer information;

assigning at the money transfer system a unique transaction number to the payment request without receiving card account information or financial account information associated with the buyer, wherein the unique transaction number is associated with the transaction between the buyer and the seller;

determining at the money transfer system a preliminary total amount required from the buyer in connection with the transaction comprising at least the transaction amount;

determining at the money transfer system a buyer local exchange rate for the preliminary total amount based upon the buyer information;

determining at the money transfer system a grand total amount expressed in the local currency of the buyer, based upon the preliminary total amount, any other applicable charges, and the determined buyer local exchange rate;

communicating information from the money transfer system to the seller computer system for displaying the grand total amount and the unique transaction number to the buyer computer system;

receiving at the money transfer system a payment notification associated with the unique transaction number from the payment location local computer, wherein the payment notification indicates payment in the amount of the grand total amount has been submitted in person at the payment location by or on behalf of the buyer, wherein the amount of the grand total amount is submitted after the unique transaction number is assigned;

communicating a message from the money transfer system to the seller computer system that payment associated with the unique transaction number has been received at a payment location upon receipt of the payment notification by the money transfer system; and effecting completion of the electronic payment request by making payment via the money transfer system to the seller upon receipt of the payment notification by the money transfer system.

52. The method of claim 51, wherein the payment location comprises a stand-alone computing system with money transfer capabilities.

53. The method of claim 51, wherein payment to the seller comprises the grand total amount expressed in the local currency of the seller, less any applicable transaction fees.

54. The method of claim 51, wherein the buyer information comprises buyer address information including a country.

55. The method of claim 51, wherein the seller computer displays a plurality of selectable payment methods for selection by the buyer in connection with the transaction, the payment methods including a cash payment method, and wherein the payment request is generated by the seller computer system in response to selection by the buyer of the cash payment method.

56. The method of claim 51, wherein the payment request information includes information selected from the group comprising buyer identification information, seller identification information, seller order number, transaction date, a summary of item(s) purchased, purchase price, shipping charges, and total price.

57. The method of claim 51, wherein the preliminary total amount comprises the sum of the transaction amount, shipping charges, and any applicable transaction fees.

58. The method of claim 51, further comprising the step of generating a unique data record corresponding to the payment request and storing the data record in a staging area associated with the money transfer system.

59. The method of claim 58, further comprising the step of storing the data record in a payment confirmation queue in response to receipt of the information from the payment location local computer that payment has been actually made at the payment location.

60. The method of claim 51, wherein payment to the seller is made by the steps of:

determining a seller local exchange rate for the funds due to the seller based upon seller information provided by the seller computer; and determining a grand total amount expressed in the local currency of the seller, based upon the grand total amount and the determined seller local exchange rate, less any applicable charges.

61. The method of claim 51, further comprising the step of determining whether an amount associated with the transaction exceeds a predetermined compliance limit, and requesting additional information from the buyer in response to a determination that said amount exceeds the predetermined compliance limit.

62. The method of claim 51, further comprising the step of, in further response to information from a payment location local computer that payment in the amount of the grand total amount has been received at the payment location, communicating a money transfer control number (MTCN) to the payment location for provision to the buyer.

63. The method of claim 62, further comprising the step of providing a receipt to the buyer at the payment location, the receipt bearing at least the money transfer control number (MTCN).

64. The method of claim 51, wherein the payment made by the buyer at the payment location is by cash, credit card, or check.

65. The method of claim 51, wherein the information provided in the step of communicating information to the seller computer system for displaying to the buyer computer system includes instructions to the buyer that payment in the grand total amount should be tendered to a payment location.

66. The method of claim 65, wherein the information provided in the step of communicating information to the seller computer system for displaying to the buyer computer system includes information as to a plurality of payment locations at which actual payment may be tendered.

67. The method of claim 51, wherein a payment gateway is positioned to communicate information between the seller computer and the money transfer system.

68. The method of claim 51, further comprising the step of canceling the transaction if the buyer does not make payment at a payment location within a predetermined time period.

69. The method of claim 51, wherein the payment request includes an order number provided by the seller computer.

70. The method of claim 51, wherein the seller is a merchant and operates an Internet-accessible web site for conducting transactions with buyer computers.

71. The method of claim 51, wherein the seller is a seller on an online auction system.

72. The method of claim 51, further comprising the steps of maintaining device queue records comprising lists of messages awaiting delivery, messages currently being delivered, and messages awaiting confirmation of delivery.

73. The method of claim 51, further comprising the step of accessing information stored at the money transfer system including the grand total amount due from the buyer, in response to receipt of a message from a payment location including the unique confirmation number, and communicating the grand total amount to the payment location.

74. In an online commerce system including a buyer computer operated by a buyer, a seller computer operated by a seller, and a network for connecting the buyer computer and the seller computer for an electronic commercial transaction, a system for effecting a payment from a buyer to a seller in connection with an electronic transaction, comprising:
  a money transfer system operative for electronic communications with one or more buyer accessible payment location local computers operated at one or more payment locations and accessible to the buyer to make a payment;
  a communication link for connecting the money transfer system to the seller computer;
  the money transfer system operative for receiving an electronic payment request from the seller computer in response to a proposed transaction between the buyer and the seller, the payment request comprising information including at least a transaction amount and buyer information;
  the money transfer system operative for assigning a unique transaction number to the payment request without receiving card account information or financial account information associated with the buyer, wherein the unique transaction number is associated with the transaction between the buyer and the seller;
  the money transfer system operative for determining a preliminary total amount required from the buyer in connection with the transaction comprising at least the transaction amount;
  the money transfer system operative for determining a buyer local exchange rate for the preliminary total amount based upon the buyer information;
  the money transfer system operative for determining a grand total amount expressed in the local currency of the buyer, based upon the preliminary total amount, any other applicable charges, and the determined buyer local exchange rate;
  the money transfer system operative for communicating information to the seller computer system for displaying the grand total amount and the unique transaction number to the buyer computer system;
  the money transfer system operative for receiving information from a payment location local computer at a payment location indicating that payment in the amount of the grand total amount has been received in person at the payment location by or on behalf of the buyer, wherein the amount of the grand total amount is submitted after the unique transaction number is assigned;
  the money transfer system operative for communicating, when receiving said information, a message associated with the unique transaction number to the seller computer system that payment has been actually made at a payment location; and
  the money transfer system operative for effecting completion of the electronic payment request by making payment to the seller upon receipt of information from a payment location local computer at a payment location that payment in the amount of the grand total amount has been received at the payment location.

75. The system of claim 74, wherein the payment location local computer comprises is a stand-alone computing system with money transfer capabilities.

76. The system of claim 74, wherein payment to the seller comprises the grand total amount expressed in the local currency of the seller, less any applicable transaction fees.

77. The system of claim 74, wherein the buyer information comprises buyer address information including a country.

78. The system of claim 74, wherein the seller computer displays a plurality of selectable payment methods for selection by the buyer in connection with the transaction, the payment methods including a cash payment method, and wherein the payment request is generated by the seller computer system in response to selection by the buyer of the cash payment method.

79. The system of claim 74, wherein the payment request information includes information selected from the group comprising buyer identification information, seller identification information, seller order number, transaction date, a summary of item(s) purchased, purchase price, shipping charges, and total price.

80. The system of claim 74, wherein the preliminary total amount comprises the sum of the transaction amount, shipping charges, and any applicable transaction fees.

81. The system of claim 74, wherein the money transfer system is further operative for generating a unique data record corresponding to the payment request and storing the data record in a staging area associated with the money transfer system.

82. The system of claim 81, wherein the money transfer system is further operative for storing the data record in a payment confirmation queue in response to receipt of the information from the payment location local computer that payment has been actually made at the payment location.

83. The system of claim 74, wherein the money transfer system is operative for making payment to the seller by:
determining a seller local exchange rate for the funds due to the seller based upon seller information provided by the seller computer; and
determining a grand total amount expressed in the local currency of the seller, based upon the grand total amount and the determined seller local exchange rate, less any applicable charges.

84. The system of claim 74, wherein the money transfer system is further operative for determining whether an amount associated with the transaction exceeds a predetermined compliance limit, and requesting additional information from the buyer in response to a determination that said amount exceeds the predetermined compliance limit.

85. The system of claim 74, wherein the money transfer system is further operative, in further response to information from a payment location local computer that payment in the amount of the grand total amount has been received at the payment location, for communicating a money transfer control number (MTCN) to the payment location for provision to the buyer.

86. The system of claim 85, wherein the money transfer system is further operative for providing a receipt to the buyer at the payment location, the receipt bearing at least the money transfer control number (MTCN).

87. The system of claim 74, wherein the payment made by the buyer at the payment location is by cash, credit card, or check.

88. The system of claim 74, wherein the information provided in the operation of communicating information to the seller computer system for displaying to the buyer computer system includes instructions to the buyer that payment in the grand total amount should be tendered to a payment location.

89. The system of claim 88, wherein the information provided in the operation of communicating information to the seller computer system for displaying to the buyer computer system includes information as to a plurality of payment locations at which actual payment may be tendered.

90. The system of claim 74, further comprising a payment gateway operatively positioned to communicate information between the seller computer and the money transfer system.

91. The system of claim 74, wherein the money transfer system is further operative for canceling the transaction if the buyer does not make payment at a payment location within a predetermined time period.

92. The system of claim 74, wherein the payment request includes an order number provided by the seller computer.

93. The system of claim 74, wherein the seller is a merchant and operates an Internet-accessible web site for conducting transactions with buyer computers.

94. The system of claim 74, wherein the seller is a seller on an online auction system.

95. The system of claim 74, wherein the money transfer system is further operative for maintaining device queue records comprising lists of messages awaiting delivery, messages currently being delivered, and messages awaiting confirmation of delivery.

96. The system of claim 74, wherein the money transfer system is further operative for accessing information stored at the money transfer system including the grand total amount due from the buyer, in response to receipt of a message from a payment location including the unique confirmation number, and for communicating the grand total amount to the payment location.

97. In an online commerce system including a buyer computer operated by a buyer, a seller computer operated by a seller, a network for connecting the buyer computer and the seller computer for an electronic commercial transaction, a method for effecting a payment from a buyer to a seller in connection with an electronic transaction, comprising the computer-implemented steps of:
providing a money transfer system connected for electronic communications with the seller computer, wherein the money transfer system is operative for electronic communications with one or more buyer accessible payment location local computers operated at one or more payment locations and accessible to the buyer to make a payment;
receiving at the money transfer system an electronic payment request from a seller computer, the payment request comprising information including at least a transaction amount and buyer information, the information being associated with a proposed transaction between a buyer and a seller;
at the money transfer system, assigning a unique transaction number to the payment request without receiving card account information or financial account information associated with the buyer, wherein the unique transaction number is associated with the transaction between the buyer and the seller;
at the money transfer system, determining a preliminary total amount required from the buyer in connection with the transaction comprising at least the transaction amount;
at the money transfer system, determining a buyer local exchange rate for the preliminary total amount based upon the buyer information;
at the money transfer system, determining a grand total amount expressed in the local currency of the buyer, based upon the preliminary total amount, any other applicable charges, and the determined buyer local exchange rate;
storing a unique payment request record comprising the grand total amount and the unique transaction record in a staging area associated with the money transfer system;
communicating payment instruction information comprising the grand total amount and the unique transaction number from the money transfer system to the seller computer system for display to the buyer computer system;
communicating the payment instruction information from the seller computer system to the buyer computer system;
displaying the payment instruction information at the buyer computer system;
at a payment location associated with the money transfer system, receiving the unique transaction number from a person on behalf of the buyer and inputting the unique transaction number to a payment location local computer at the payment location;
communicating the unique transaction number from the payment location local computer to the money transfer system;
at the money transfer system, and in response to receipt of the unique transaction number from a payment location local computer, retrieving the payment request record associated with the unique transaction number from the staging area;

communicating information associated with the payment request record to the payment location local computer, for use at the payment location in collecting payment from the buyer;

in response to tender of payment in the grand total amount by or on behalf of the buyer in person at the payment location, communicating a payment made message from the payment location local computer to the money transfer system, wherein the payment made message indicates payment in the amount of the grand total amount has been submitted by or on behalf of the buyer at the payment location, wherein the payment of the grand total amount is submitted after the unique transaction number is assigned;

in response to receipt of the payment made message from the payment location local computer, communicating a message from the money transfer system to the seller computer system that payment associated with the unique transaction number has been received at a payment location; and effecting completion of the electronic payment request by making payment to the seller via the money transfer system upon receipt of the payment made message by the money transfer system.

98. The method of claim 97, wherein the payment location local computer comprises a stand-alone computing system with money transfer capabilities.

99. The method of claim 97, wherein payment to the seller comprises the grand total amount expressed in the local currency of the seller, less any applicable transaction fees.

100. The method of claim 97, wherein the buyer information comprises buyer address information including a country.

101. The method of claim 97, wherein the seller computer displays a plurality of selectable payment methods for selection by the buyer in connection with the transaction, the payment methods including a cash payment method, and wherein the payment request is generated by the seller computer system in response to selection by the buyer of the cash payment method.

102. The method of claim 97, wherein the payment request information includes information selected from the group comprising buyer identification information, seller identification information, seller order number, transaction date, a summary of item(s) purchased, purchase price, shipping charges, and total price.

103. The method of claim 97, wherein the preliminary total amount comprises the sum of the transaction amount, shipping charges, and any applicable transaction fees.

104. The method of claim 97, further comprising the step of storing the data record in a payment confirmation queue associated with the money transfer system in response to receipt of the information from the payment location local computer that payment has been actually made at the payment location.

105. The method of claim 97, wherein payment to the seller is made by the steps of:

determining a seller local exchange rate for the funds due to the seller based upon seller information provided by the seller computer; and determining a grand total amount expressed in the local currency of the seller, based upon the grand total amount and the determined seller local exchange rate, less any applicable charges.

106. The method of claim 97, further comprising the step of determining at the money transfer system whether an amount associated with the transaction exceeds a predetermined compliance limit, and requesting additional information from the buyer in response to a determination that said amount exceeds the predetermined compliance limit.

107. The method of claim 97, further comprising the step of, in further response to information from a payment location local computer that payment in the amount of the grand total amount has been actually made at the payment location, communicating a money transfer control number (MTCN) from the money transfer system to the payment location for provision to the buyer.

108. The method of claim 107, further comprising the step of providing a receipt to the buyer at the payment location, the receipt bearing at least the money transfer control number (MTCN).

109. The method of claim 97, wherein the payment made by the buyer at the payment location is by cash, credit card, or check.

110. The method of claim 97, wherein the displayed payment instruction information includes instructions to the buyer that payment in the grand total amount as expressed in the buyer's local currency should be tendered to a payment location.

111. The method of claim 110, further comprising the step of communicating payment location information from the money transfer system to the seller computer for display at the buyer computer system, the payment location information comprising the addresses of a plurality of payment locations at which actual payment may be tendered.

112. The method of claim 97, wherein a payment gateway is positioned to communicate information between the seller computer and the money transfer system.

113. The method of claim 97, further comprising the step of canceling the transaction if the buyer does not make payment at a payment location within a predetermined time period.

114. The method of claim 97, wherein the payment request includes an order number provided by the seller computer.

115. The method of claim 97, wherein the seller is a merchant and operates an Internet-accessible web site for conducting transactions with buyer computers.

116. The method of claim 97, wherein the seller is a seller on an online auction system.

117. The method of claim 97, further comprising the steps of maintaining device queue records at the money transfer system comprising lists of messages awaiting delivery, messages currently being delivered, and messages awaiting confirmation of delivery.

118. An online commerce system for effecting a payment from a buyer to a seller in connection with an electronic transaction, the buyer operating a network-accessible buyer computer operative for electronic communications with other computers, comprising:

a seller computer operated by a seller and operative for electronic communications with other computers, including the buyer computer;

a money transfer system operative for electronic communications with the seller computer and operative for electronic communications with at least one payment location local computer operated at one or more remote payment locations and accessible to the buyer to make a payment;

a communication link between the seller computer and the money transfer system;

one or more communication links between the money transfer system and the at least one payment location local computer at the one or more remote payment locations;

the seller computer operative in response to a proposed transaction with a buyer for communicating an electronic payment request to the money transfer system, the payment request comprising information including at least a transaction amount and buyer information;

the money transfer system operative for receiving the payment request from the seller computer and assigning a unique transaction number to the payment request associated with the transaction between the buyer and the seller without receiving card account information or financial account information associated with the buyer;

the money transfer system further operative for determining a preliminary total amount required from the buyer in connection with the transaction comprising at least the transaction amount;

the money transfer system further operative for determining a buyer local exchange rate for the preliminary total amount based upon the buyer information;

the money transfer system further operative for determining a grand total amount expressed in the local currency of the buyer, based upon the preliminary total amount, any other applicable charges, and the determined buyer local exchange rate;

the money transfer system further operative for storing a unique payment request record comprising the grand total amount and the unique transaction record in a staging area associated with the money transfer system;

the money transfer system further operative for communicating payment instruction information to the seller computer system comprising the grand total amount and the unique transaction number, for display to the buyer computer system;

the seller computer operative for communicating the payment instruction information to the buyer computer system, for display of said payment instruction information to the buyer;

a payment location local computer at a payment location associated with the money transfer system, in response to input of a supplied unique transaction number, operative for communicating the supplied unique transaction number to the money transfer system;

the money transfer system operative, in response to receipt of the supplied unique transaction number from a payment location local computer, for retrieving the payment request record associated with the supplied unique transaction number from the staging area;

the money transfer system further operative for communicating information associated with the payment request record to the payment location local computer, for use at the payment location in collecting payment from the buyer;

the payment location local computer at the payment location operative, in response to input of data indicating tender of payment in the grand total amount by or on behalf of the buyer at the payment location, for communicating a payment made message associated with the unique transaction number to the money transfer system, wherein the payment made message indicates payment in the amount of the grand total amount has been submitted at the payment location, wherein the amount of the grand total amount is submitted after the unique transaction number is assigned;

the money transfer system operative, in response to receipt of the payment made message from the payment location local computer, for communicating a message associated with the unique transaction number to the seller computer system that payment has been received at a payment location by or on behalf of the buyer; and the money transfer system further operative, in response to receipt of the payment made message from the payment location local computer, for effecting completion of the electronic payment request by making payment to the seller.

119. The system of claim 118, wherein the payment location local computer comprises a stand-alone computing system with money transfer capabilities.

120. The system of claim 118, wherein payment to the seller comprises the grand total amount expressed in the local currency of the seller, less any applicable transaction fees.

121. The system of claim 118, wherein the buyer information comprises buyer address information including a country.

122. The system of claim 118, wherein the seller computer is operative for communicating information to the buyer computer for display at the buyer computer a plurality of selectable payment methods for selection by the buyer in connection with the transaction, the payment methods including a cash payment method, and wherein the payment request is generated by the seller computer system in response to selection by the buyer of the cash payment method.

123. The system of claim 118, wherein the payment request information includes information selected from the group comprising buyer identification information, seller identification information, seller order number, transaction date, a summary of item(s) purchased, purchase price, shipping charges, and total price.

124. The system of claim 118, wherein the preliminary total amount comprises the sum of the transaction amount, shipping charges, and any applicable transaction fees.

125. The system of claim 118, wherein the money transfer system is operative for storing the data record in a payment confirmation queue associated with the money transfer system in response to receipt of the information from the payment location local computer that payment has been actually made at the payment location.

126. The system of claim 118, wherein the money transfer system is operative to make payment to the seller by:
    determining a seller local exchange rate for the funds due to the seller based upon seller information provided by the seller computer; and
    determining a grand total amount expressed in the local currency of the seller, based upon the grand total amount and the determined seller local exchange rate, less any applicable charges.

127. The system of claim 118, wherein the money transfer system is operative for determining whether an amount associated with the transaction exceeds a predetermined compliance limit, and requesting additional information from the buyer in response to a determination that said amount exceeds the predetermined compliance limit.

128. The system of claim 118, wherein the money transfer system is operative, in further response to information from the payment location local computer that payment in the amount of the grand total amount has been actually made at the payment location, for communicating a money transfer control number (MTCN) to the payment location for provision to the buyer.

129. The system of claim 128, wherein the money transfer system is operative for providing a receipt to the buyer at the payment location, the receipt bearing at least the money transfer control number (MTCN).

130. The system of claim 118, wherein the payment made by the buyer at the payment location is by cash, credit card, or check.

131. The system of claim 118, wherein the displayed payment instruction information includes instructions to the buyer that payment in the grand total amount as expressed in the buyer's local currency should be tendered to a payment location.

132. The system of claim 131, wherein the money transfer system is operative for communicating payment location information to the seller computer for display at the buyer computer system, the payment location information comprising the addresses of a plurality of payment locations at which actual payment may be tendered.

133. The system of claim 118, further comprising a payment gateway operatively positioned to communicate information between the seller computer and the money transfer system.

134. The system of claim 118, wherein the money transfer system is operative for canceling the transaction if the buyer does not make payment at a payment location within a predetermined time period.

135. The system of claim 118, wherein the payment request includes an order number provided by the seller computer.

136. The system of claim 118, wherein the seller is a merchant and operates an Internet-accessible web site for conducting transactions with buyer computers.

137. The system of claim 118, wherein the seller is a seller on an online auction system.

138. The system of claim 118, further comprising the steps of maintaining device queue records at the money transfer system comprising lists of messages awaiting delivery, messages currently being delivered, and messages awaiting confirmation of delivery.

\* \* \* \* \*